US010327232B2

(12) United States Patent
Wang et al.

(10) Patent No.: US 10,327,232 B2
(45) Date of Patent: Jun. 18, 2019

(54) TECHNIQUES FOR ALLOCATING TIME AND FREQUENCY RESOURCES TO AN UPLINK CHANNEL TO CARRY UPLINK CONTROL INFORMATION USED FOR NARROWBAND COMMUNICATION

(71) Applicant: QUALCOMM Incorporated, San Diego, CA (US)

(72) Inventors: Renqiu Wang, San Diego, CA (US); Wanshi Chen, San Diego, CA (US); Alberto Rico Alvarino, San Diego, CA (US); Hao Xu, San Diego, CA (US); Peter Gaal, San Diego, CA (US); Seyed Ali Akbar Fakoorian, San Diego, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 15/245,640

(22) Filed: Aug. 24, 2016

(65) Prior Publication Data

US 2017/0064694 A1 Mar. 2, 2017

Related U.S. Application Data

(60) Provisional application No. 62/213,553, filed on Sep. 2, 2015.

(51) Int. Cl.
*H04W 74/08* (2009.01)
*H04W 72/04* (2009.01)
(Continued)

(52) U.S. Cl.
CPC ...... *H04W 72/0413* (2013.01); *H04B 7/0626* (2013.01); *H04B 7/0632* (2013.01);
(Continued)

(58) Field of Classification Search
CPC ......... H04W 72/0413; H04W 72/0446; H04W 72/0453; H04W 74/08; H04L 5/0048; H04L 5/0055
See application file for complete search history.

(56) References Cited

U.S. PATENT DOCUMENTS

| 2011/0223927 | A1 | 9/2011 | Seo et al. |
| 2013/0170435 | A1* | 7/2013 | Dinan ............... H04L 45/50 370/328 |

(Continued)

OTHER PUBLICATIONS

Ericsson et al., "Narrowband LTE—Concept Description," 3GPP TSG RAN WG1 Meeting #82, R1-154659, Bejing, China, Aug. 24-28, 2015, 9 pgs., XP051001893, 3rd Generation Partnership Project.

(Continued)

*Primary Examiner* — Wei Zhao
(74) *Attorney, Agent, or Firm* — Holland & Hart LLP

(57) ABSTRACT

Techniques are described for wireless communication. A method for wireless communication at a base station includes identifying time resources and frequency resources for narrowband communication in a plurality of subframes, identifying a plurality of user equipment (UE) devices, allocating a first portion of the time resources and the frequency resources to an uplink (UL) channel to carry UL control information, and allocating resources of the UL channel to the identified UE devices. A method for wireless communication at a UE device includes identifying time resources and frequency resources for narrowband communication in a plurality of subframes, receiving an indication of at least a first portion of the time resources and the frequency resources allocated to a UL channel to carry UL control information for the UE device, and transmitting one or both of downlink acknowledgements (ACKs) and downlink non-acknowledgements (NAKs) on the UL channel.

36 Claims, 21 Drawing Sheets

(51) Int. Cl.
*H04L 5/00* (2006.01)
*H04B 7/06* (2006.01)
*H04W 72/12* (2009.01)
*H04J 13/00* (2011.01)

(52) U.S. Cl.
CPC .......... *H04L 5/0048* (2013.01); *H04L 5/0055* (2013.01); *H04W 72/044* (2013.01); *H04W 72/0446* (2013.01); *H04W 72/0453* (2013.01); *H04W 72/1278* (2013.01); *H04W 74/0833* (2013.01); *H04J 2013/0088* (2013.01)

(56) References Cited

U.S. PATENT DOCUMENTS

| | | | | |
|---|---|---|---|---|
| 2014/0036859 | A1* | 2/2014 | Ekpenyong | H04W 72/042 370/330 |
| 2014/0044056 | A1* | 2/2014 | Chen | H04W 72/04 370/329 |
| 2018/0160453 | A1* | 6/2018 | Lee | H04W 72/04 |

OTHER PUBLICATIONS

ISA/EP, International Search Report and Written Opinion of the International Searching Authority, Int'l Application No. PCT/US2016/048546, dated Nov. 18, 2016, European Patent Office, Rijswijk, NL, 14 pgs.

Sierra Wireless; "PAPR Reduction and Power Savings for Sub-PRB PUSCH Transmission Technique," 3GPP TSG-RAN WG1 Meeting #80-BIS, R1-151473, Belgrade; Apr. 20-24, 2015, 4 pgs., XP050934345, 3rd Generation Partnership Project.

* cited by examiner

TECHNIQUES FOR ALLOCATING TIME AND FREQUENCY RESOURCES TO AN UPLINK CHANNEL TO CARRY UPLINK CONTROL INFORMATION USED FOR NARROWBAND COMMUNICATION

CROSS REFERENCES

The present application for patent claims priority to U.S. Provisional Patent Application No. 62/213,553 by Wang, et al., entitled "Techniques For Allocating Time And Frequency Resources To A Dedicated Physical Uplink Control Channel Used For Narrowband Communication," filed Sep. 2, 2015, assigned to the assignee hereof.

BACKGROUND

Field of the Disclosure

The present disclosure relates to wireless communication systems, for example, and more particularly to allocating time and frequency resources to a UL channel to carry uplink control information used for narrowband communication.

Description of Related Art

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system or LTE-Advanced (LTE-A) system). A wireless multiple-access communication system may include a number of base stations, each simultaneously supporting communication for multiple communication devices, which may be otherwise known as user equipment (UE) devices. A base station may communicate with UE devices on downlink channels (e.g., for transmissions from a base station to a UE device) and uplink channels (e.g., for transmissions from a UE device to a base station).

Some types of UE devices may communicate with a base station or other UE devices using narrowband communication. Narrowband communication may include, for example, narrowband LTE (NB-LTE) communication, M2M communication (of which Machine Type Communication (MTC) may be considered a part for purposes of this disclosure), NB-Internet of Things (NB-IoT) communication, etc.). Given the narrow bandwidth of narrowband communication, choices may need to be made regarding the types of channels and signals to which narrowband resources are allocated, as well as the manner in which narrowband resources are allocated to such channels and signals and the configurations of such channels and signals.

SUMMARY

The present disclosure, for example, relates to techniques for allocating time and frequency resources to an uplink (UL) channel used for narrowband communication. Resources may be allocated to a UL channel for the purpose of transmitting or receiving information such as downlink acknowledgements (ACKs), downlink non-acknowledgements (NAKs), or channel quality information (CQI). In some cases, the UL channel may be a UL control channel such as physical uplink control channel (PUCCH). In some examples, CQI may not be transmitted on a UL channel, but may instead be transmitted on a physical uplink shared channel (PUSCH) or not transmitted. When CQI is not transmitted from a UE device to a base station, the base station may approximate channel state information (CSI) in a number of ways. In some examples, resources may be allocated to a UL channel, and resources of the UL channel may be allocated to a plurality of UE devices, in ways that optimize (e.g., maximize) the UE device transmission capacity of the UL channel and/or optimize (e.g., minimize) the transmission times of UE devices.

A method of wireless communication is described. The method may include identifying time resources and frequency resources for narrowband communication in a plurality of subframes, identifying a plurality of UE devices, allocating at least a first portion of the time resources and the frequency resources to a UL channel to carry UL control information, and allocating resources of the UL channel to the identified plurality of UE devices.

An apparatus for wireless communication is described. The apparatus may include means for identifying time resources and frequency resources for narrowband communication in a plurality of subframes, means for identifying a plurality of UE devices, means for allocating at least a first portion of the time resources and the frequency resources to a UL channel to carry UL control information, and means for allocating resources of the UL channel to the identified plurality of UE devices.

Another apparatus for wireless communication is described. The apparatus may include a processor, memory in electronic communication with the processor, and instructions stored in the memory. The instructions may be operable to cause the processor to identify time resources and frequency resources for narrowband communication in a plurality of subframes, identify a plurality of UE devices, allocate at least a first portion of the time resources and the frequency resources to a UL channel to carry UL control information, and allocate resources of the UL channel to the identified plurality of UE devices.

A non-transitory computer readable medium for wireless communication is described. The non-transitory computer-readable medium may include instructions operable to cause a processor to identify time resources and frequency resources for narrowband communication in a plurality of subframes, identify a plurality of UE devices, allocate at least a first portion of the time resources and the frequency resources to an UL channel to carry UL control information, and allocate resources of the UL channel to the identified plurality of UE devices.

Some examples of the method, apparatus, and non-transitory computer-readable medium described above may further include processes, features, means, or instructions for receiving from one or more of the plurality of UE devices, on the UL channel, one or both of downlink ACKs and downlink NAKs.

Some examples of the method, apparatus, and non-transitory computer-readable medium described above may further include processes, features, means, or instructions for multiplexing the UL channel with one or more of a physical uplink shared channel (PUSCH), a physical random access channel (PRACH), a sounding reference signal (SRS), or a combination thereof, in one or both of a time domain and a frequency domain.

In some examples of the method, apparatus, and non-transitory computer-readable medium described above, the UL channel comprises a dedicated PUCCH.

Some examples of the method, apparatus, and non-transitory computer-readable medium described above may further include processes, features, means, or instructions for allocating a same number of resources of the UL channel to reference symbol transmissions and data symbol transmissions.

In some examples of the method, apparatus, and non-transitory computer-readable medium described above, allocating resources of the UL channel to the plurality of UE devices comprises: allocating resources of the UL channel to the plurality of UE devices using cross-slot code division multiplexing (CDM) in a time domain, CDM in a frequency domain, frequency domain multiplexing (FDM), or a combination thereof.

Some examples of the method, apparatus, and non-transitory computer-readable medium described above may further include processes, features, means, or instructions for receiving, on the UL channel, a multiple tone transmission from the plurality of UE devices.

Some examples of the method, apparatus, and non-transitory computer-readable medium described above may further include processes, features, means, or instructions for receiving on the UL channel, in parallel, a single tone transmission from the plurality of UE devices.

Some examples of the method, apparatus, and non-transitory computer-readable medium described above may further include processes, features, means, or instructions for receiving from a UE device of the plurality of UE devices, in parallel on the UL channel, a plurality of single tone transmissions.

In some examples of the method, apparatus, and non-transitory computer-readable medium described above, allocating at least the first portion of the time resources and the frequency resources to the UL channel comprises: allocating a same set of frequency resources or a different set of frequency resources to the UL channel from one subframe to another subframe in the plurality of subframes.

In some examples of the method, apparatus, and non-transitory computer-readable medium described above, allocating resources of the UL channel to the plurality of UE devices comprises: allocating resources of the UL channel to the plurality of UE devices using intra-resource block frequency hopping.

In some examples of the method, apparatus, and non-transitory computer-readable medium described above, the time resources and the frequency resources of the UL channel allocated to the plurality of UE devices comprise bundled transmission time intervals (TTIs).

Some examples of the method, apparatus, and non-transitory computer-readable medium described above may further include processes, features, means, or instructions for approximating CSI for at least one downlink of the narrowband communication based at least in part on a measurement of an SRS, CQI for an uplink of the narrowband communication, a CQI received on a PUSCH, or a combination thereof.

In some examples of the method, apparatus, and non-transitory computer-readable medium described above, allocating resources of the UL channel to the plurality of UE devices comprises: allocating resources of the UL channel to a UE device of the plurality of UE devices based at least in part on a coverage enhancement (CE) level associated with the UE device.

Some examples of the method, apparatus, and non-transitory computer-readable medium described above may further include processes, features, means, or instructions for transmitting an SRS during each symbol period of each subframe of the plurality of subframes.

A method of wireless communication is described. The method may include identifying time resources and frequency resources for narrowband communication in a plurality of subframes, receiving an indication of at least a first portion of the time resources and the frequency resources allocated to a UL channel to carry UL control information for the UE device, and transmitting one or both of downlink ACKs and downlink NAKs on the UL channel.

An apparatus for wireless communication is described. The apparatus may include means for identifying time resources and frequency resources for narrowband communication in a plurality of subframes, means for receiving an indication of at least a first portion of the time resources and the frequency resources allocated to a UL channel to carry UL control information for the UE device, and means for transmitting one or both of downlink ACKs and downlink NAKs on the UL.

Another apparatus for wireless communication is described. The apparatus may include a processor, memory in electronic communication with the processor, and instructions stored in the memory. The instructions may be operable to cause the processor to identify time resources and frequency resources for narrowband communication in a plurality of subframes, receive an indication of at least a first portion of the time resources and the frequency resources allocated to a UL channel to carry UL control information for the UE device, and transmit one or both of downlink ACKs and downlink NAKs on the UL channel.

A non-transitory computer readable medium for wireless communication is described. The non-transitory computer-readable medium may include instructions operable to cause a processor to identify time resources and frequency resources for narrowband communication in a plurality of subframes, receive an indication of at least a first portion of the time resources and the frequency resources allocated to a UL channel to carry UL control information for the UE device, and transmit one or both of downlink ACKs and downlink NAKs on the UL channel.

Some examples of the method, apparatus, and non-transitory computer-readable medium described above may further include processes, features, means, or instructions for transmitting a physical uplink shared channel (PUSCH), wherein the UL channel may be multiplexed with the PUSCH.

In some examples of the method, apparatus, and non-transitory computer-readable medium described above, the UL channel comprises a dedicated PUCCH.

Some examples of the method, apparatus, and non-transitory computer-readable medium described above may further include processes, features, means, or instructions for transmitting a same number of reference symbols and data symbols on the UL channel.

Some examples of the method, apparatus, and non-transitory computer-readable medium described above may further include processes, features, means, or instructions for transmitting on the UL channel using cross-slot CDM in a time domain, CDM in a frequency domain, FDM, or a combination thereof.

BRIEF DESCRIPTION OF THE DRAWINGS

A further understanding of the nature and advantages of the present disclosure may be realized by reference to the following drawings. In the appended figures, similar components or features may have the same reference label. Further, various components of the same may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The described features generally relate to improved systems, methods, and apparatuses for allocating time and frequency resources to a UL channel to carry uplink control information used for narrowband communication. In some examples, narrowband UE devices may support very low throughput communications, be power efficient, be deployed indoors or outdoors in sometimes challenging environments, be relatively low cost, or have a reduced complexity (e.g., a narrowband UE device may not support circuit-switched services or inter-radio access technology (RAT) mobility). In some examples, the density of narrowband UE devices in a wireless communication system may be on the order of hundreds or thousands per base station or access point, whereas the density of wideband UE devices may be much lower.

Given the above differences between narrowband UE devices and wideband UE devices, UL channels to carry uplink control information designed specifically for narrowband communication may be desirable. In some cases, a UL channel may be an UL control channel or dedicated UL control channel, for example a dedicated PUCCH. In some examples, it may be desirable to retain the LTE/LTE-A resource allocation framework when allocating resources to such an UL channel, to avoid resource fragmentation. In some examples, a UL channel to carry uplink control information may be designed to optimize UE device transmission capacity and/or UE device transmission times.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
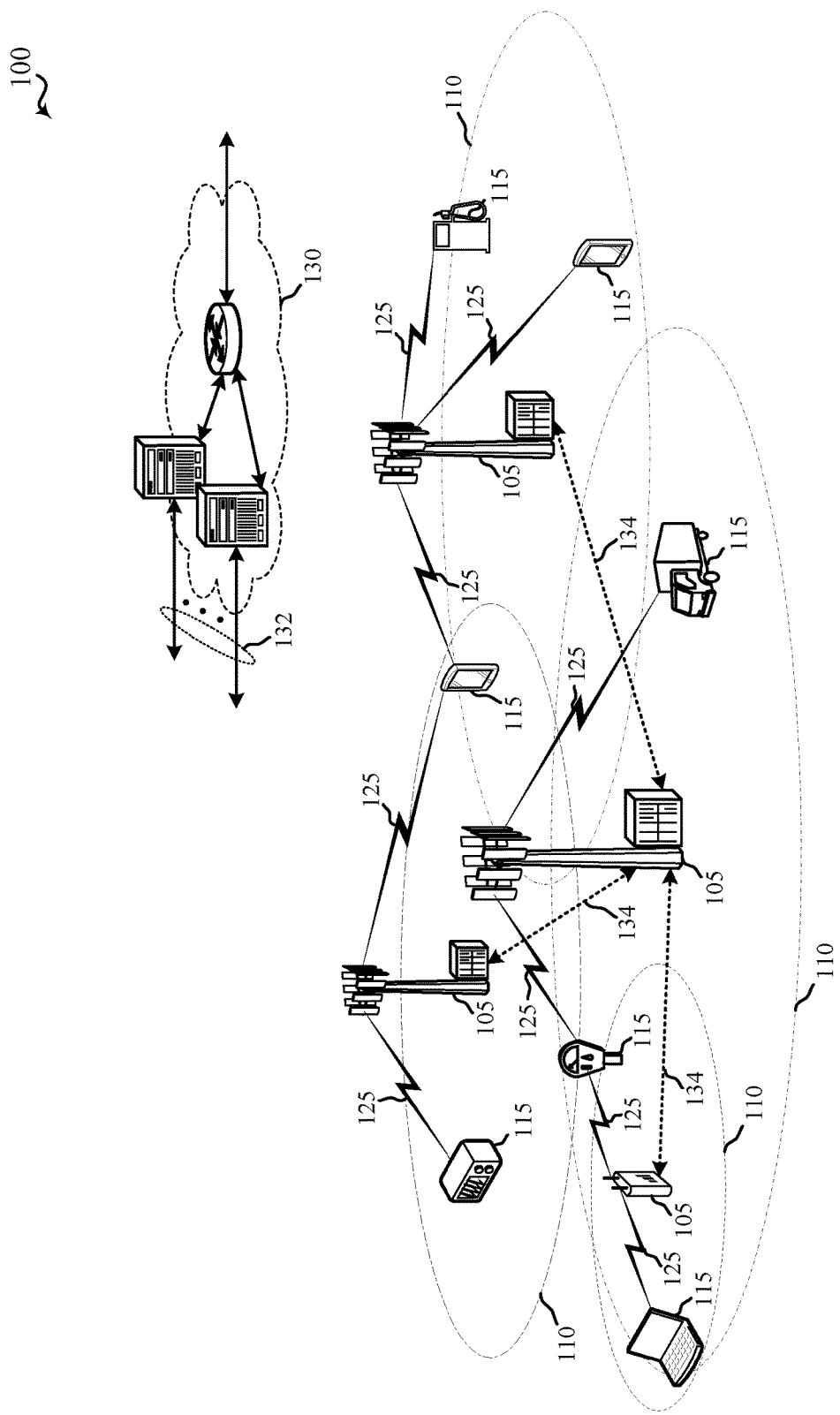
FIG. 1 shows an example of a wireless communication system, in accordance with various aspects of the present disclosure.

FIG. 1 shows an example of a wireless communication system 100, in accordance with various aspects of the present disclosure. The wireless communication system 100 may include base stations 105, UE devices 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UE devices 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UE devices 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors (not shown) making up a portion of the coverage area. The wireless communication system 100 may include base stations 105 of different types (e.g., macro or small cell base stations). There may be overlapping geographic coverage areas 110 for different technologies.

In some examples, the wireless communication system 100 may include an LTE/LTE-A network and may employ narrowband communication techniques, as described below. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UE devices with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UE devices with service subscriptions with the network provider. A femto cell also may cover a relatively small geographic area (e.g., a home) and may provide restricted access by UE devices having an association with the femto cell (e.g., UE devices in a closed subscriber group (CSG), UE devices for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE device 115 and the base stations 105 or core network 130 supporting radio bearers for the user plane data. At the Physical (PHY) layer, the transport channels may be mapped to Physical channels.

The UE devices 115 may be dispersed throughout the wireless communication system 100, and each UE device 115 may be stationary or mobile. A UE device 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE device 115 may be a cellular phone, a personal digital assistant (PDA), a wireless modem, a wireless communication device, a handheld device, a tablet computer, a laptop computer, a cordless phone, a wireless local loop (WLL) station, a NB-LTE device, a M2M device, a MTC device, a NB-IoT device or the like. A UE device 115 may be able to communicate with various types of base stations 105 and network equipment, including macro eNBs, small cell eNBs, relay base stations, and the like.

The communication links 125 shown in wireless communication system 100 may include downlink (DL) transmissions, from a base station 105 to a UE device 115, or UL transmissions, from a UE device 115 to a base station 105. The downlink transmissions may also be called forward link transmissions, while the uplink transmissions may also be called reverse link transmissions. The communication links 125 may include UL channel resources for narrowband communication, as described in the present disclosure.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

Figure 2:
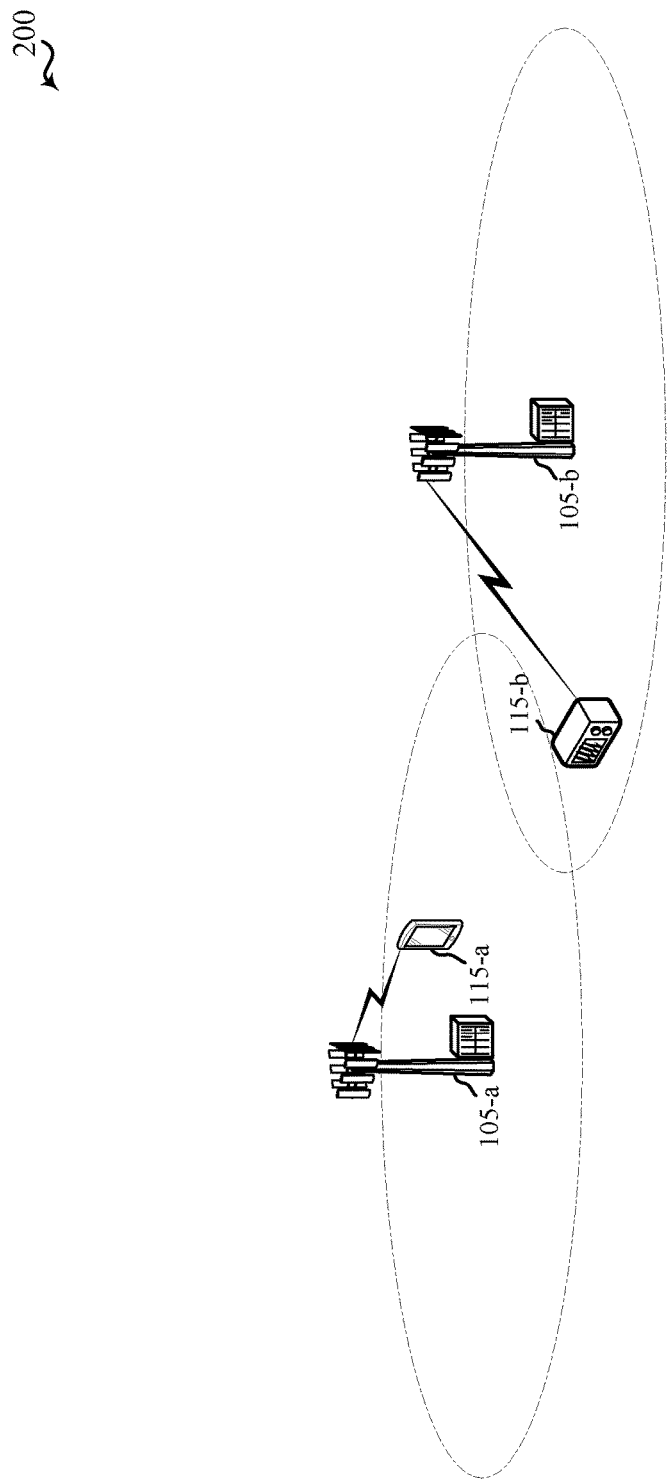
FIG. 2 shows an example of a wireless communication system, in accordance with various aspects of the present disclosure.

FIG. 2 shows an example of a wireless communication system 200, in accordance with various aspects of the present disclosure. The wireless communication system 200 may be an example of a portion of the wireless communication system 100, and may include a first base station 105-*a*, a second base station 105-*b*, a first UE device 115-*a*, and a second UE device 115-*b*.

In some examples, the first base station 105-*a* may communicate with the first UE device 115-*a* using wideband communication, and the second base station 105-*b* may communicate with the second UE device 115-*b* using narrowband communication. The wideband communication and narrowband communication may occur within the same radio frequency spectrum, and thus, it may be desirable to allocate resources for wideband communication and narrowband communication in a manner that enables co-existence of the devices communicating using wideband communication and the devices using narrowband communication.

In some examples of the wireless communication system 200, the first base station 105-*a* may be additionally capable of narrowband communication, or the second base station 105-*b* may be additionally capable of wideband communication. Similarly, the first UE device 115-*a* may be additionally capable of narrowband communication, or the second UE device 115-*b* may be additionally capable of wideband communication.

Figure 3:
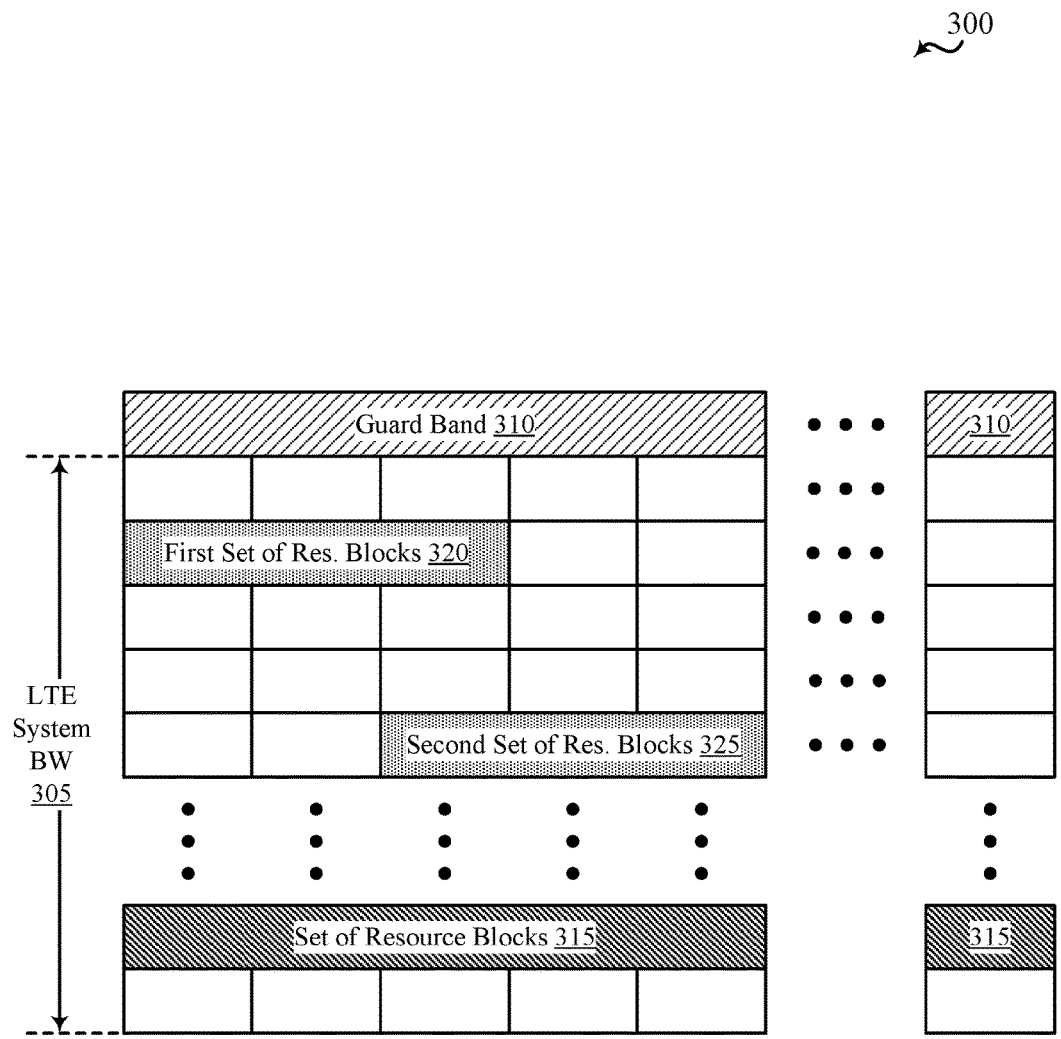
FIG. 3 shows time and frequency resource allocations that provide co-existence between LTE and NB-LTE communications, in accordance with various aspects of the present disclosure.

FIG. 3 shows time and frequency resource allocations 300 that provide co-existence between LTE and NB-LTE communications, in accordance with various aspects of the present disclosure. The LTE communications may occur between a first base station and a set of LTE-capable UE devices. The NB-LTE communications may occur between the first base station (or a second base station) and a set of NB-LTE-capable UE devices. A particular UE device may be included in the set of LTE-capable UE devices, the set of NB-LTE-capable UE devices, or the set of LTE-capable UE devices and the set of NB-LTE-capable UE devices. In some examples, the first base station and second base station may be examples of the base stations 105 described with reference to FIGS. 1 and 2, and the LTE-capable UE devices and NB-LTE-capable UE devices may be examples of the UE devices 115 described with reference to FIGS. 1 and 2.

To provide co-existence between LTE and NB-LTE communications, time and frequency resources may be allocated for NB-LTE communications within a resource allocation framework based at least in part on LTE OFDM numerology and LTE resource blocks. In a first example of NB-LTE resource allocation, out-of-band LTE resources (e.g., resources located outside an LTE system bandwidth 305) may be allocated for NB-LTE communications. In some examples, the out-of-band LTE resources allocated for NB-LTE communications may be located in a guard band 310 adjacent the LTE system bandwidth 305. In second and third examples of NB-LTE resource allocation, in-band LTE resources (e.g., resources located inside the LTE system bandwidth 305) may be allocated for NB-LTE communications. In the second example, the in-band LTE resources allocated for NB-LTE communications may be located in a set of resource blocks 315 spanning a same subset of frequency resources in each subframe. In the third example, the in-band LTE resources allocated for NB-LTE communications may be located in different resource blocks in different subframes (e.g., a first set of resource blocks 320 spanning a first subset of frequency resources may be determined to be unused for LTE communications, and thus available for NB-LTE communications) during each subframe in a first set of subframes (e.g., during subframes SF0, SF1, and SF2) and a second set of resource blocks 325 spanning a second subset of frequency resources may be determined to be unused for LTE communications, and thus available for NB-LTE communications, during each subframe in a second set of subframes (e.g., during subframes SF2, SF3, and SF4).

When configuring a NB-LTE uplink, resources may need to be allocated to a plurality of different channels or signals, such as a PRACH, a PUCCH, a PUSCH, or a SRS (e.g., the PRACH, the PUCCH, the PUSCH, and the SRS may need to be multiplexed on the NB-LTE uplink). Resources may also need to be allocated to a plurality of UE devices (e.g., resource allocations for different UE devices may need to be multiplexed on the NB-LTE uplink). In some examples, the resources of a NB-LTE uplink may be allocated to different channels/signals or UE devices using a LTE tone spacing, in which 12 tones are defined within the bandwidth of a single resource block. In other examples, the number, granularity, or dimension of NB-LTE uplink resources may be increased by using a NB-LTE tone spacing that is finer than LTE tone spacing. For example, 72 tones (e.g., the equivalent of 6 LTE resource blocks) may be defined within the bandwidth of a single LTE resource block and allocated to different channels/signals or UE devices in a NB-LTE uplink.

In some examples, a base station may communicate with one or more UE devices using a CE level, in which a greater transmit power or TTI bundling may be used to improve reception at a receiving device (e.g., a base station or UE device). TTI bundling may enable repetition of a transmission, and repetition may improve detection or decoding of the transmission. In some examples, a plurality of CE levels (e.g., 4 CE levels), associated with different transmit powers or combinations of transmit power and TTI bundling, may be defined.

NB-LTE uplink resource allocations that account for factors such as the multiplexing of a plurality of channels/signals, the multiplexing of a plurality of UE devices, or the use of one or more CE levels within a narrow band are described in the present disclosure. The resource allocations may, for example, allocate NB-LTE resources (e.g., the NB-LTE resources of a superframe) to a plurality of channels or signals (e.g., a PRACH, a PUCCH, a PUSCH, and a SRS) using TDM, FDM, or a combination thereof, and allocate NB-LTE resources to a plurality of UE devices using TDM, FDM, CDM in a time domain, CDM in a frequency domain, or a combination thereof. The CDM in the time domain may include, for example, cross-symbol CDM, cross-slot CDM, or cross-subframe CDM.

In some examples, NB-LTE resources may be allocated a UL channel. In some examples, NB-LTE frequency resources may be allocated to the UL channel by allocating a same set of frequency resources to the UL channel for a first slot and a second slot of each subframe in a plurality of subframes (e.g., the frequency resources allocated to the UL channel may not hop from one resource block to another resource block intra-subframe). In some examples, NB-LTE frequency resources may be allocated to the UL channel by allocating a same set of frequency resources or a different set of frequency resources to the UL channel from one subframe to another subframe in the plurality of subframes. In some cases, the UL channel may be an example of a UL control channel such as a dedicated PUCCH.

In some examples, CDM in the time domain may be used to allocate resources of the UL channel to a plurality of UE devices. In these examples, CDM in the frequency domain or FDM may also be used to allocate resources of the UL channel to the plurality of UE devices. CDM in the frequency domain may provide more frequency diversity per UE device when UE devices are associated with lower CE levels, and FDM may provide transmission capacity for more UE devices when UE devices are associated with higher CE levels. In some examples, FDM may be used to allocate resources of the UL channel to the plurality of UE devices, but CDM may not be used.

In some examples, frequency resources of the UL channel may be allocated to a plurality of UE devices with or without using intra-resource block frequency hopping. In some examples, resources of the UL channel may be allocated to the plurality of UE devices using bundled TTIs. In some examples, a same number of resources of the UL channel may be allocated to reference symbols and data symbols.

In some examples, resources of the UL channel may be allocated to the plurality of UE devices for transmitting downlink ACKs, downlink NAKs, CQI, or a combination thereof, and a base station receiving the CQI may determine CSI for a NB-LTE downlink based at least in part on the received CQI. In other examples, resources of the UL channel may be allocated to the plurality of UE devices for transmitting downlink ACKs, downlink NAKs, or a combination thereof, and a base station receiving the downlink ACKs or downlink NAKs may approximate CSI for a NB-LTE downlink based at least in part on measurement of a SRS, CQI for a NB-LTE uplink, CQI received on a PUSCH, or a combination thereof. An approximation of CSI for the NB-LTE downlink may be sufficient, for example, for a UE device operating deep in the base station's coverage area, because CQI reported by the deep coverage UE device may be prone to inaccuracy, and given the long distance between the base station and the deep coverage UE device, CQI for the NB-LTE uplink and the NB-LTE downlink may be approximately the same.

In some examples, resources of the UL channel may be allocated to a UE device of the plurality of UE devices based at least in part on a CE level associated with the UE device.

According to an example, for UE devices associated with a higher CE level, single tone resources may be used for an UL channel. The UL channel (e.g., an ACK channel) may be allocated to one or more of the UE devices for the transmission of downlink ACKs, downlink NAKs, or a combination thereof. FDM may be used for allocations to different UE devices in the frequency domain when single tone resources are used for the UL channel (e.g., the ACK channel). In other examples, using CDM in frequency across a bandwidth at a lower CE level for a number of UE devices may have a higher overall multiplexing capacity than a single tone allocation multiplexed in the frequency domain as described above.

In some examples, a single tone allocation, with CDM in the time domain, may be used to allocate resources of an UL channel (e.g., an ACK channel) to a plurality of UE devices. Two or more OFDM symbol periods may be allocated to data or reference signal transmissions, including ACK transmissions. The two or more OFDM symbol periods may be pairs of OFDM symbol periods. The OFDM symbol periods may be adjacent in time, or non-adjacent.

In some cases, a system supporting an UL channel usable for narrowband communications (e.g., NB-LTE communications) may support multiple different techniques described herein to allocate resources to UL channels, including for allocating an ACK channel, for different UE devices. For example, a base station may support allocating single tone resources for an ACK channel where resources are allocated to more than one UE device using CDM in the time domain. The same base station may also support allocating a single tone for an ACK channel, where resources for ACK channels for different UE devices are allocated to different tones using FDM. The base station may also support allocating an ACK channels for UE devices using CDM in both the time domain and the frequency domain (e.g., for a resource block). In some examples, a base station may select a technique to allocate resources for UL channels, such as ACK channels, for each of one or more UE devices based on channel characteristics associated with transmissions to and from a UE device. For example, an allocation for an ACK channel to UE devices having good channel characteristics may use techniques where the ACK channel is allocated using CDM in both time and frequency domains for a resource block, while an allocation for an ACK channel to UE devices having poor channel characteristics may use one of the single tone allocation techniques described above. The base station may support different allocation techniques between different resource blocks, for example between different resource blocks of the same slot or same subframe, or across different slots or subframes.

Figure 4:
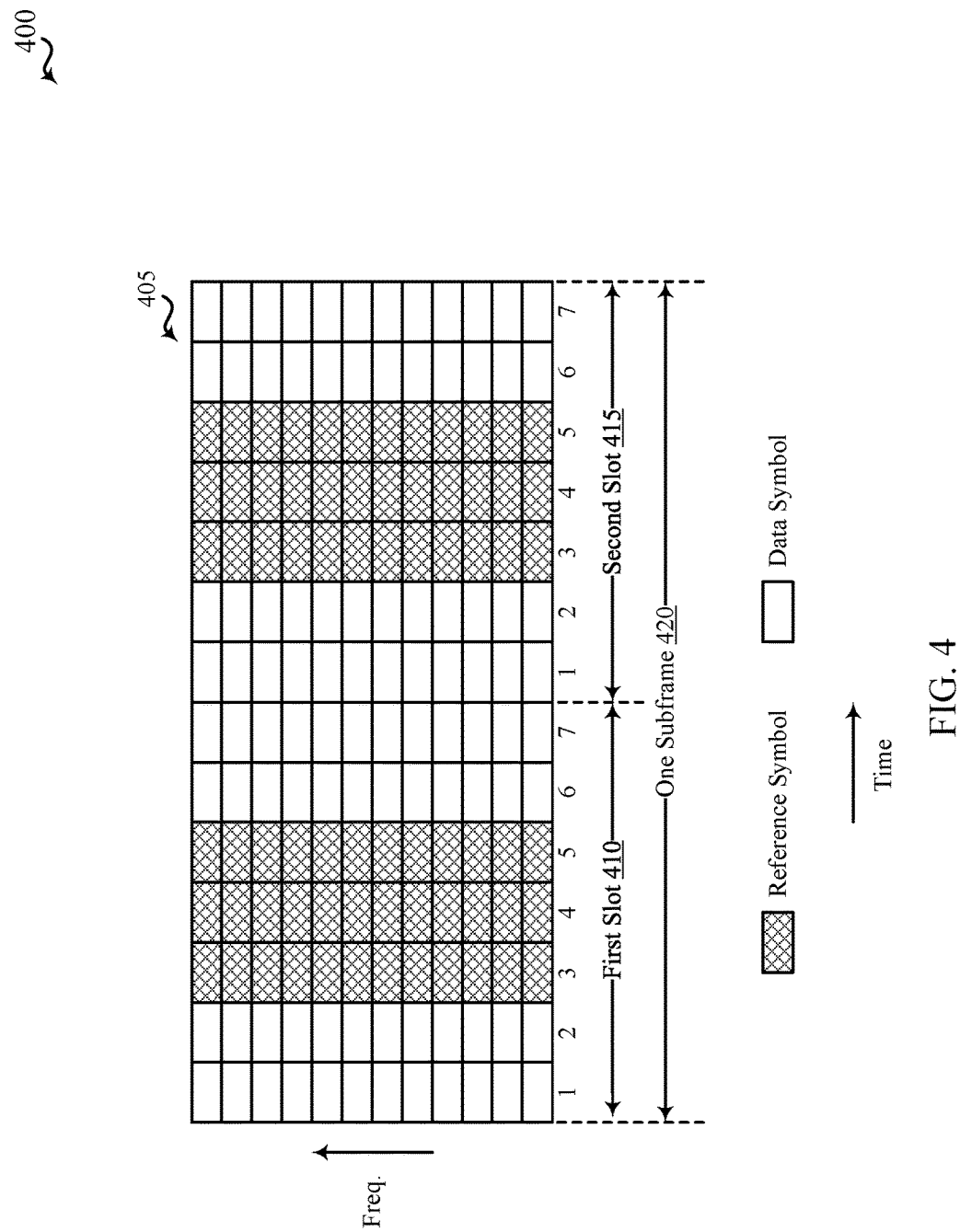
FIG. 4 shows a time and frequency resource allocation for a UL channel usable for narrowband communications (e.g., NB-LTE communications), in accordance with various aspects of the present disclosure.

FIG. 4 shows a time and frequency resource allocation 400 for a UL channel usable for narrowband communications (e.g., NB-LTE communications), in accordance with various aspects of the present disclosure. The narrowband communications may occur between a base station and a set of narrowband (e.g., NB-LTE-capable) UE devices. In some examples, the base station may be an example of the base stations 105 described with reference to FIGS. 1 and 2, and the narrowband UE device may be an example of the UE devices 115 described with reference to FIGS. 1 and 2.

By way of example, the time and frequency resource allocation 400 may correspond to a single LTE resource block 405 having 168 reference elements (e.g., a resource block spanning twelve tones and fourteen OFDM symbol periods). The OFDM symbol periods may define two slots (e.g., a first slot 410 and a second slot 415) and one subframe 420. The OFDM symbol periods of each slot are numbered 1 through 7. The resource elements associated with OFDM symbol periods 3, 4, and 5 of each slot may be allocated for reference symbol transmissions, and the resource elements associated with OFDM symbol periods 1, 2, 6, and 7 of each slot may be allocated to data symbol transmissions (e.g., downlink ACK/NAK transmissions), similarly to a time and frequency resource allocation for a LTE PUCCH.

In some examples, the frequency resources allocated to the UL channel in FIG. 4 may be a same set of frequency resources or a different set of frequency resources that are allocated to the UL channel in one or more other subframes. In some cases, the UL channel may be an example of a UL control channel such as a dedicated PUCCH.

In some examples, cross-slot CDM in the time domain may be used to allocate resources of the UL channel to a plurality of UE devices. Cross-slot CDM in the time domain may be enabled, at least in part, by allocating a same set of frequency resources to the UL channel for the first slot and the second slot of each subframe (e.g., by restricting intra-subframe frequency hopping between resource blocks when allocating frequency resources to the UL channel within a subframe). In some examples, applying the cross-slot CDM in the time domain may include applying an orthogonal cover code to the eight OFDM symbol periods allocated to data symbol transmissions in the first slot 410 and the second slot 415, and applying a discrete Fourier transform (DFT) that has a spreading factor of 6 to the six OFDM symbol periods allocated to reference symbol transmissions in the first slot 410 and the second slot 415. In some examples, the cross-slot CDM may include cross-subframe CDM in the time domain. In some examples, the cross-slot CDM in the time domain may be used with CDM in the frequency domain to allocate resources of the UL channel to the plurality of UE devices. In other examples, the cross-slot CDM in the time domain may be used with FDM to allocate resources of the UL channel to the plurality of UE devices (e.g., each UE device may be allocated one or more individual tones). In some examples, the frequency resources of the time and frequency resource allocation 400 may be subdivided into 72 tones.

Figure 5:
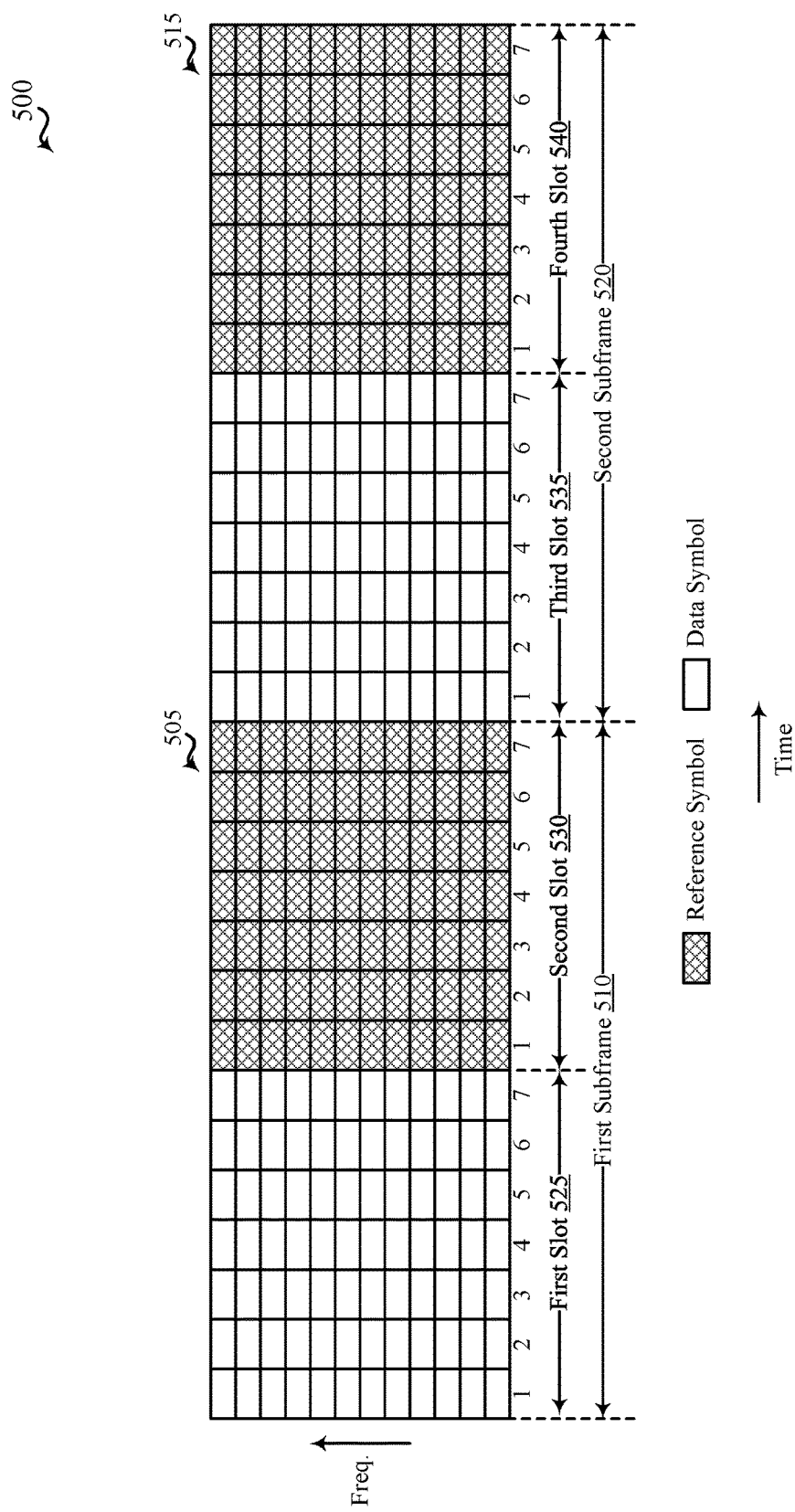
FIG. 5 shows a time and frequency resource allocation for a UL channel usable for narrowband communications (e.g., NB-LTE communications), in accordance with various aspects of the present disclosure.

FIG. 5 shows a time and frequency resource allocation 500 for a UL channel usable for narrowband communications (e.g., NB-LTE communications), in accordance with various aspects of the present disclosure. The narrowband communications may occur between a base station and a set of narrowband (e.g., NB-LTE-capable) UE devices. In some examples, the base station may be an example of a base station 105 described with reference to FIGS. 1 and 2, and the narrowband UE device may be an example of a UE device 115 described with reference to FIGS. 1 and 2. In some cases, the UL channel may be an example of a UL control channel such as a dedicated PUCCH.

By way of example, the time and frequency resource allocation 500 may correspond to a pair of LTE resource blocks or subframes (e.g., a first LTE resource block 505 or first subframe 510, and a second LTE resource block 515 or second subframe 520) having a combined 336 reference elements (e.g., each LTE resource block may span twelve tones and fourteen OFDM symbol periods). The OFDM symbol periods of each LTE resource block may define two slots (e.g., the OFDM symbol periods of the first LTE resource block 505 may define a first slot 525 and a second slot 530, and the OFDM symbol periods of the second LTE resource block 515 may define a third slot 535 and a fourth slot 540).

A same number of resources (e.g., resource elements) of the UL channel may be allocated to reference symbol transmissions and data symbol transmissions. For example, the resource elements included in the second slot of each LTE resource block or subframe (e.g., the resource elements included in the second slot 530 and the fourth slot 540) may be allocated to reference symbol transmissions, and the resource elements included in the first slot of each LTE resource block or subframe (e.g., the first slot 525 and the third slot 535) may be allocated to data symbol transmissions. Alternatively, the OFDM symbol periods of the UL channel may be alternately allocated to reference symbol transmissions and data symbol transmissions. Allocations of multiple consecutive OFDM symbol periods to reference symbol transmissions or data symbol transmissions may in some cases provide better orthogonality and increased UE device transmission capacity. Allocations of alternating OFDM symbol periods to reference symbol transmissions or data symbol transmissions may in some cases provide better channel estimation. In other alternatives, subframes (e.g., the first subframe 510 and the second subframe 520) may be alternately allocated to reference symbol transmissions and data symbol transmissions, or the resources allocated to the UL channel may be equally allocated to reference symbol transmissions and data symbol transmissions in other ways. An allocation of equal (same) numbers of resources to reference symbol transmissions and data symbol transmissions may provide better quality transmissions, and may enable spreading over a greater number of resources (e.g., DFT spreading by applying a DFT having a spreading factor of 7 times an orthogonal cover code (e.g., such that the spreading factor for DFT may be 7, 14, 21, etc.), which can increase the transmission capacity of the UL channel to handle transmissions of more UE devices. In some examples, the spreading factor may be limited by a TTI bundling size, where TTI bundling size may be limited by device (e.g., UE device) mobility.

In some examples, the frequency resources allocated to the UL channel in FIG. 4 may be a same set of frequency resources or a different set of frequency resources that are allocated to the UL channel in one or more other subframes.

In some examples, cross-subframe CDM in the time domain may be used to allocate resources of the UL channel to a plurality of UE devices. Cross-subframe CDM in the time domain may be enabled, at least in part, by allocating a same set of frequency resources to the UL channel for the first subframe 510 and the second subframe 520 (e.g., by restricting intra-subframe and inter-subframe frequency hopping between resource blocks when allocating frequency resources to the UL channel within a subframe), though inter-subframe frequency may be allowed when allocating resources of different TTI bundles to the UL channel. In other examples, cross-slot CDM in the time domain and FDM may be used to allocate resources of the UL channel to a plurality of UE devices (e.g., each UE device may be allocated one or more individual tones). In some examples, the frequency resources of the time and frequency resource allocation 500 may be subdivided into 72 tones.

Figure 6:
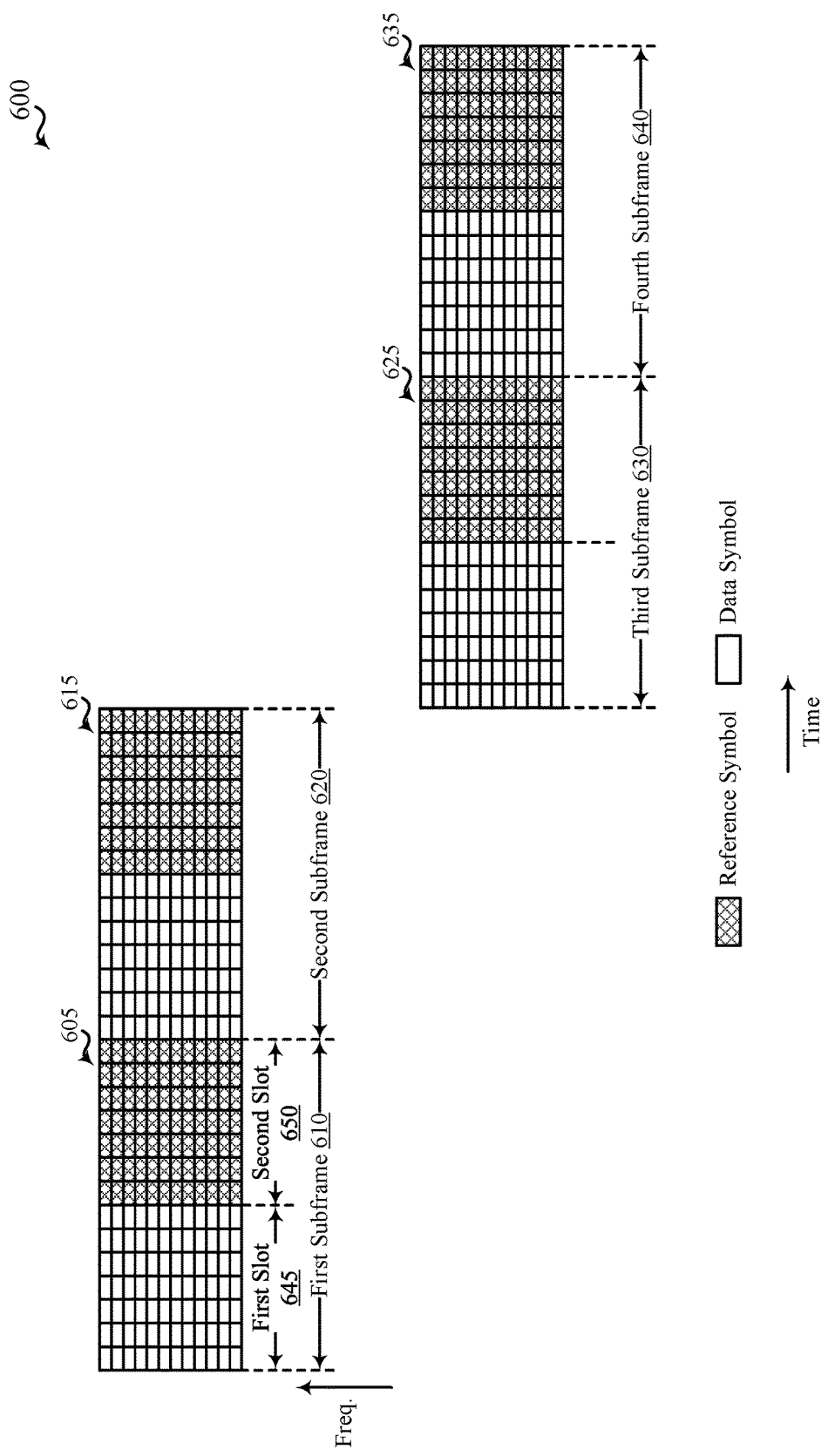
FIG. 6 shows a time and frequency resource allocation a UL channel usable for narrowband communications (e.g., NB-LTE communications), in accordance with various aspects of the present disclosure.

FIG. 6 shows a time and frequency resource allocation 600 for a UL channel usable for narrowband communications (e.g., NB-LTE communications), in accordance with various aspects of the present disclosure. The narrowband communications may occur between a base station and a set of narrowband (e.g., NB-LTE-capable) UE devices. In some examples, the base station may be an example of the base stations 105 described with reference to FIGS. 1 and 2, and the narrowband UE device may be an example of the UE devices 115 described with reference to FIGS. 1 and 2. In some cases, the UL channel may be an example of a UL control channel such as a dedicated PUCCH.

By way of example, the time and frequency resource allocation 600 may correspond to four LTE resource blocks or subframes (e.g., a first LTE resource block 605 or first LTE subframe 610, a second LTE resource block 615 or second LTE subframe 620, a third LTE resource block 625 or third subframe 630, and a fourth LTE resource block 635 or fourth subframe 640) having a combined 672 reference elements (e.g., each LTE resource block may span twelve tones and fourteen OFDM symbol periods). The OFDM symbol periods of each LTE resource block may define two slots (e.g., the OFDM symbol periods of the first LTE resource block 605 may define a first slot 645 and a second slot 650, etc.).

The TTIs (e.g., slots) of the first LTE subframe 610 and the second LTE subframe 620 may be bundled, and cross-subframe CDM in the time domain may be used to allocate the resources of the first LTE resource block 605 and the second LTE resource block 615 to a plurality of UE devices, as described with reference to FIG. 5. CDM in the frequency domain or FDM may also be used to allocate the resources of the first LTE resource block 605 and the second LTE resource block 615 to the plurality of UE devices. The TTIs of the third LTE resource block 625 and the fourth LTE resource block 635 may also be bundled, and cross-subframe CDM in the time domain and other techniques described with reference to FIG. 5 may be used to allocate the resources of the third LTE resource block 625 and the fourth LTE resource block 635 to a plurality of UE devices.

The same or different frequency resources may be allocated to the slots and subframes corresponding to bundled TTIs. As shown in FIG. 6, frequency hopping may be allowed between two segments of bundled TTIs (e.g., the frequency resources associated with different segments of bundled TTIs may be the same or different). Frequency hopping within a bundled transmission can provide frequency diversity.

The TTIs (e.g., subframes) of the first LTE resource block 605 and the second LTE resource block 615 may be bundled, and cross-subframe CDM in the time domain may be used to allocate the resources of the first LTE resource block 605 and the second LTE resource block 615 to a plurality of UE devices, as described with reference to FIG. 5. CDM in the frequency domain or FDM may also be used to allocate the resources of the first LTE resource block 605 and the second LTE resource block 615 to the plurality of UE devices. The TTIs of the third LTE resource block 625 and the fourth LTE resource block 635 may also be bundled, and cross-subframe CDM in the time domain and other techniques described with reference to FIG. 5 may be used to allocate the resources of the third LTE resource block 625 and the fourth LTE resource block 635 to a plurality of UE devices.

As shown in FIG. 6, the same frequency resources may be allocated to the slots and subframes corresponding to bundled TTIs. However, cross-subframe frequency hopping may be allowed between two segments of bundled TTIs (e.g., the frequency resources associated with different segments of bundled TTIs may be the same or different).

Figure 7:
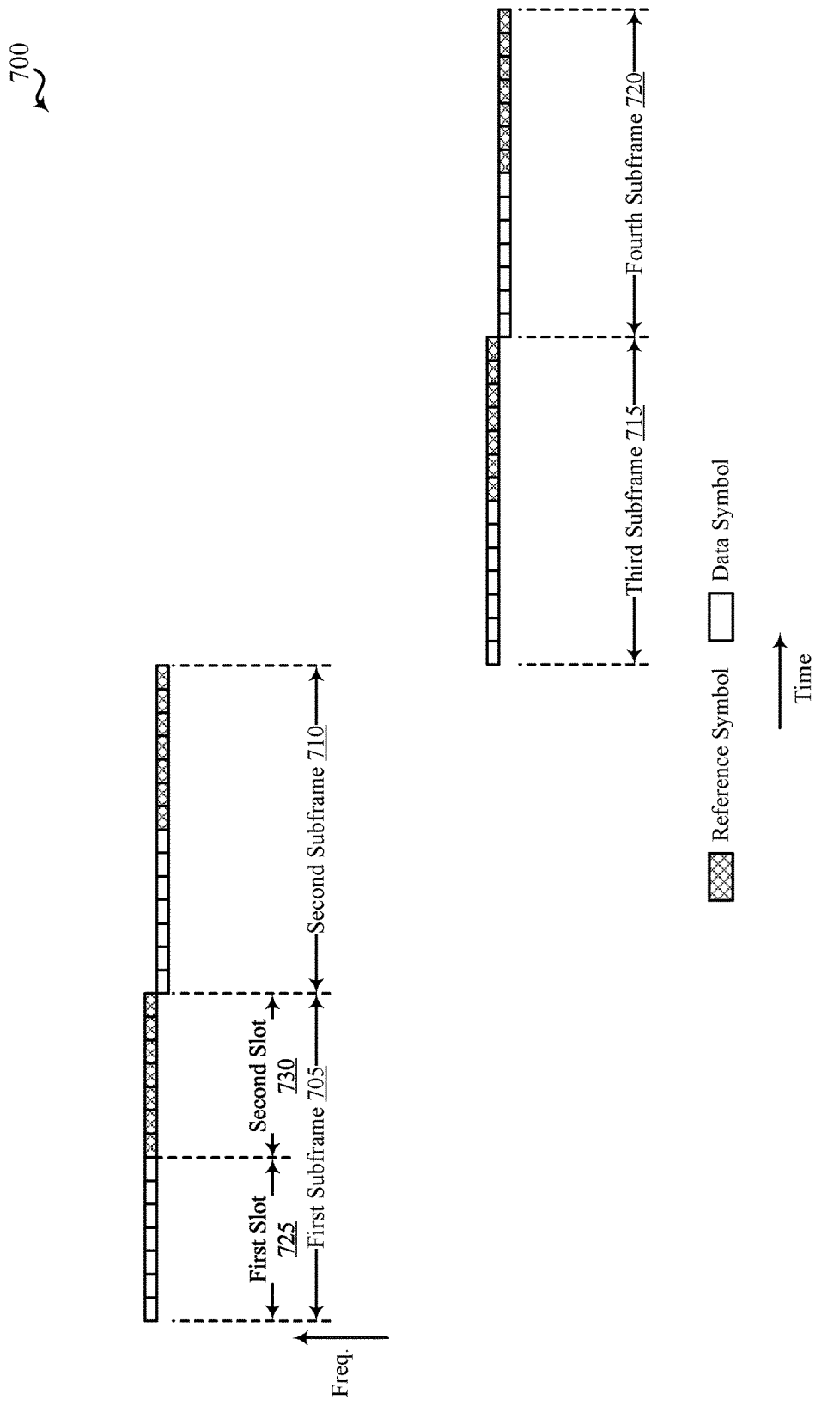
FIG. 7 shows single tone resources of a UL channel usable for narrowband communications (e.g., NB-LTE communications), which single tone resources may be allocated to a narrowband UE device in accordance with various aspects of the present disclosure.

FIG. 7 shows single tone resources 700 of a UL channel usable for narrowband communications (e.g., NB-LTE communications), which single tone resources may be allocated to a narrowband UE device in accordance with various aspects of the present disclosure. The narrowband communications may occur between a base station and the narrowband UE device. In some examples, the base station may be an example of the base stations 105 described with reference to FIGS. 1 and 2, and the narrowband UE device may be an example of the UE devices 115 described with reference to FIGS. 1 and 2. In some cases, the UL channel may be an example of a UL control channel such as a dedicated PUCCH.

By way of example, single tone resources 700 may correspond to four LTE subframes (e.g., a first LTE subframe 705, a second LTE subframe 710, a third LTE subframe 715, and a fourth LTE subframe 720). Each LTE subframe may span fourteen OFDM symbol periods. The OFDM symbol periods of each LTE subframe may define two slots (e.g., the OFDM symbol periods of the first LTE subframe 705 may define a first slot 725 and a second slot 730, etc.).

The TTIs (e.g., slots) of the first LTE subframe 705, the second LTE subframe 710, the third LTE subframe 715, and the fourth LTE subframe 720 may be bundled. Within each TTI bundle, the tones allocated to a UE device may hop frequency within a LTE resource block (cross-subframe, as shown in FIG. 7, or cross-slot). Between TTI bundles, the tones allocated to the UE device may hop frequency between LTE resource blocks. However, the frequency hopping with a LTE resource block within a TTI bundle may interfere with the use of cross-slot or cross-subframe CDM in the time domain.

In some cases, for example when UE devices may be associated with a higher CE level, single tone resources 700 may be used for an UL channel. As further discussed above, an UL channel (e.g., an ACK channel) may be allocated to one or more of the UE devices for the transmission of downlink ACKs, downlink NAKs, or a combination thereof. An ACK channel, or another UL channel, may use the single tone resources 700 for the transmission of ACKs/NAKs. A UE device may use the single tone resources 700 for a particular slot (e.g., first slot 725) or subframe (e.g., first subframe 705), with allocations for a number of different users (e.g., narrowband UE devices) being frequency domain multiplexed across portions or all of the bandwidth for the slot or subframe.

In some cases, the use of a higher CE level may result in a lower overall effective bandwidth. Use of FDM for a single tone allocation for an ACK channel (or other UL channel) may improve overall multiplexing capacity in cases where a higher CE level is used. For example, overall multiplexing capacity when using a single tone allocation FDMed across a bandwidth for a higher CE level may be an improvement in capacity with respect to using CDM in frequency across the bandwidth for the higher CE level. In other examples, such as for UE devices using a lower CE level, using CDM in frequency across a bandwidth may have a higher overall multiplexing capacity than the single tone allocation using FDM across the bandwidth for the users.

Figure 8:
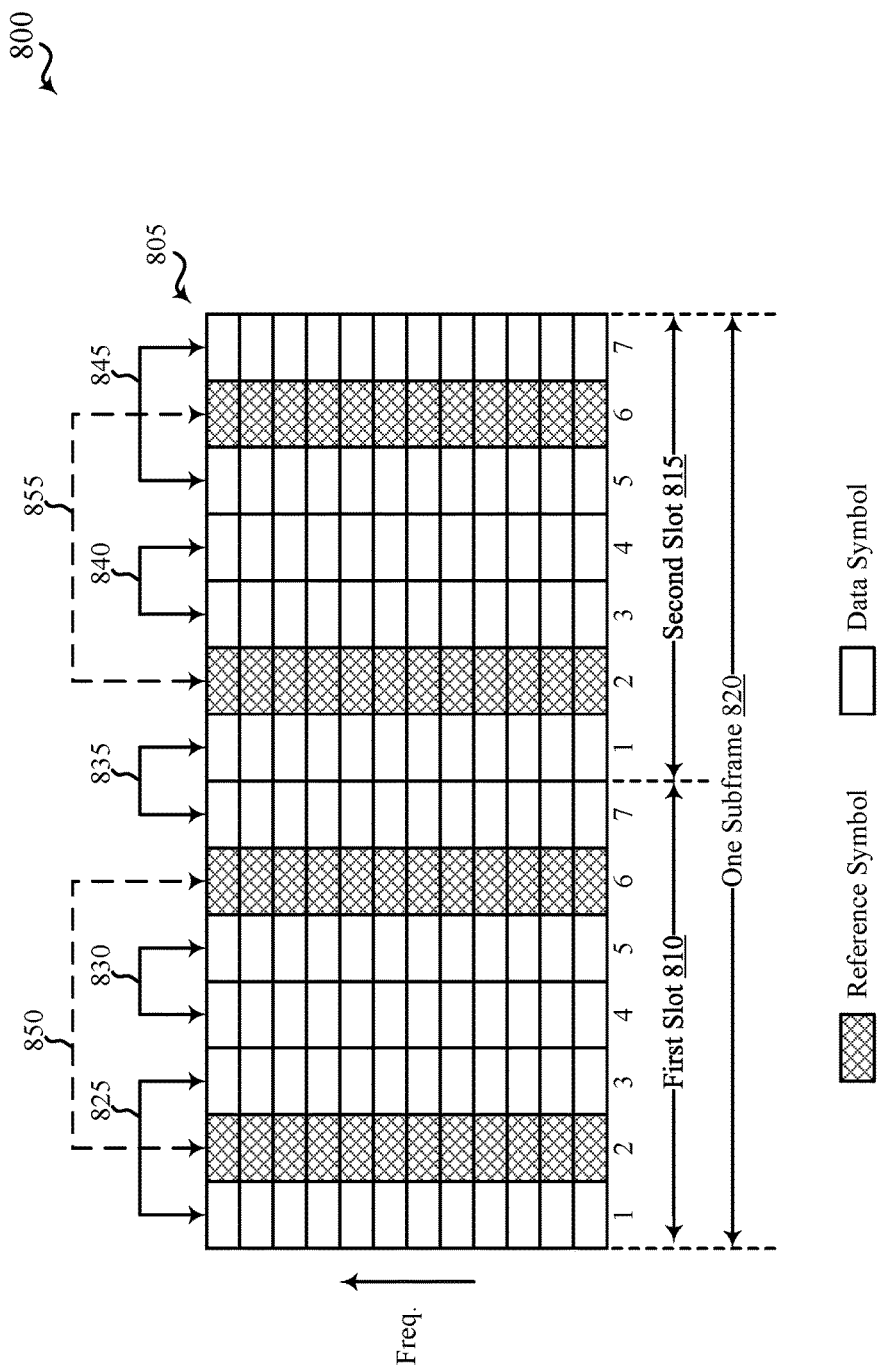
FIG. 8 shows a time and frequency resource allocation for a UL channel usable for narrowband communications (e.g., NB-LTE communications), in accordance with various aspects of the present disclosure.

FIG. 8 shows a time and frequency resource allocation 800 for a UL channel usable for narrowband communications (e.g., NB-LTE communications), in accordance with various aspects of the present disclosure. The narrowband communications may occur between a base station and a set of narrowband (e.g., NB-LTE-capable) UE devices. In some examples, the base station may be an example of the base stations 105 described with reference to FIGS. 1 and 2, and the narrowband UE device may be an example of the UE devices 115 described with reference to FIGS. 1 and 2. In some cases, the UL channel may be an example of a UL control channel such as a dedicated PUCCH.

By way of example, the time and frequency resource allocation 800 may correspond to a single LTE resource block 805 having 168 reference elements (e.g., a resource block spanning twelve tones and fourteen OFDM symbol periods). The OFDM symbol periods may define two slots (e.g., a first slot 810 and a second slot 815) and one subframe 820. The OFDM symbol periods of each slot are numbered 1 through 7. The resource elements associated with OFDM symbol periods 2 and 6 of each slot may be allocated for reference symbol transmissions, and the resource elements associated with OFDM symbol periods 1, 3, 4, 5, and 7 of each slot may be allocated to data symbol transmissions (e.g., CQI transmissions), similarly to a time and frequency resource allocation for a LTE PUCCH. In some examples, the frequency resources allocated to the UL channel in FIG. 8 may be a same set of frequency resources or a different set of frequency resources that are allocated to the UL channel in one or more other subframes.

In some examples, CDM in the time domain may be used to allocate resources of the UL channel to a plurality of UE devices. In some examples, applying the CDM in the time domain may include applying an orthogonal cover code to pairs of the OFDM symbol periods allocated to data symbol transmissions (e.g., to a first OFDM symbol pair 825, a second OFDM symbol pair 830, a third OFDM symbol pair 835, a fourth OFDM symbol pair 840, and a fifth OFDM symbol pair 845). Cross-slot CDM in the time domain (e.g., for applying an orthogonal cover code to the third OFDM symbol pair 835) may be enabled, at least in part, by allocating a same set of frequency resources to the UL channel for the first slot 810 and the second slot 815 of the subframe 820 (e.g., by restricting intra-subframe frequency hopping between resource blocks when allocating frequency resources to the UL channel within a subframe). Applying CDM in the time domain may also include applying a spreading factor of 2 orthogonal cover codes (or other CDM codes) to pairs of the OFDM symbol periods allocated to reference symbol transmissions (e.g., to a sixth OFDM symbol pair 850 and a seventh OFDM symbol pair 855). In some examples, the CDM in the time domain may be used with CDM in the frequency domain to allocate resources of the UL channel to the plurality of UE devices.

In other examples, the CDM in the time domain may be used with FDM to allocate resources of the UL channel to the plurality of UE devices (e.g., each UE device may be allocated one or more individual tones). For example, CDM in the time domain may be used to allocate resources of a UL channel to a first set of UE devices as described above for a single tone of LTE resource block 805, where CDM may be applied (e.g., by applying an orthogonal cover code) to more than one OFDM symbol periods allocated to data or reference symbol transmissions for that tone. The more than one OFDM symbol periods may be pairs of OFDM symbol periods as described above. In the example for a single tone allocation, FDM may be applied, but CDM may not be applied in the frequency domain. The code division multiplexed OFDM symbols may be frequency domain multiplexed within LTE resource block 805.

For additional UE devices, such as a second set of UE devices, CDM in the time domain may be applied similarly for one or more other tones of LTE resource block 805. CDM may be applied to OFDM symbol periods for data or reference symbol periods.

In some examples as described above, one or more of the pairs of OFDM symbol periods may carry one or more single tone ACKs or NAKs of one or more ACK channels for the UE devices. Thus, an ACK channel (e.g., to carry downlink ACKs and downlink NAKs) for a UE device may be a single tone transmission with CDM in the time domain along with one or more other ACK channels for other UE devices. The ACK channels may be frequency division multiplexed (and not code division multiplexed in frequency) within LTE resource block 805.

In some examples, the frequency resources of the time and frequency resource allocation 800 may be subdivided into 72 tones.

Figure 9:
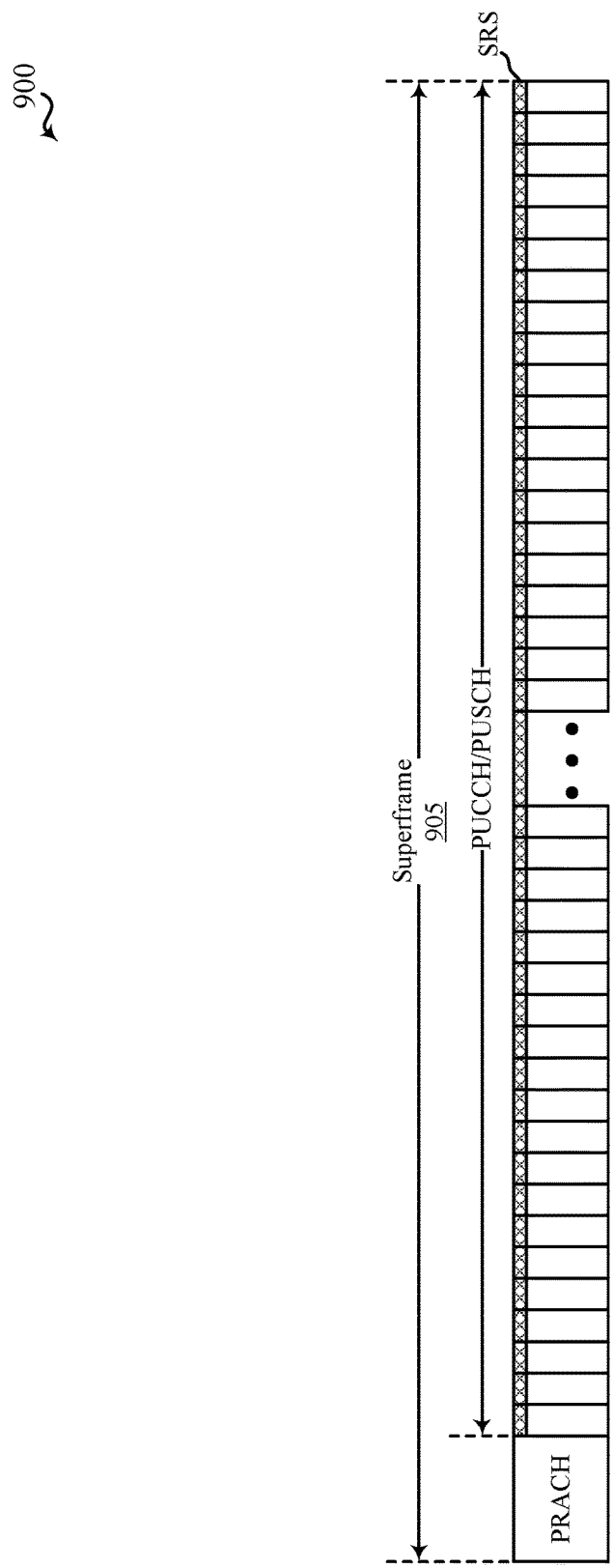
FIG. 9 shows a time and frequency resource allocation within a superframe usable for narrowband communications (e.g., NB-LTE communications), in accordance with various aspects of the present disclosure.

FIG. 9 shows a time and frequency resource allocation 900 within a superframe 905 usable for narrowband communications (e.g., NB-LTE communications), in accordance with various aspects of the present disclosure. The narrowband communications may occur between a base station and a set of narrowband (e.g., NB-LTE-capable) UE devices. In some examples, the base station may be an example of the base stations 105 described with reference to FIGS. 1 and 2, and the narrowband UE device may be an example of the UE devices 115 described with reference to FIGS. 1 and 2.

By way of example, the resources of the superframe 905 may be allocated to a PRACH, a UL channel carrying UL control information, a PUSCH, and a SRS. In some cases, the UL channel may be an example of a UL control channel such as a dedicated PUCCH. In some examples, resources may be allocated to the SRS in each symbol period of each subframe of the superframe. In some examples, resources may be allocated to the SRS in a last symbol period of each subframe in which resources are allocated to the UL channel or the PUSCH. The PRACH, the UL channel, the PUSCH, and the SRS may be multiplexed on the resources of the superframe 905 in the time domain, the frequency domain, or a combination thereof.

Figure 10:
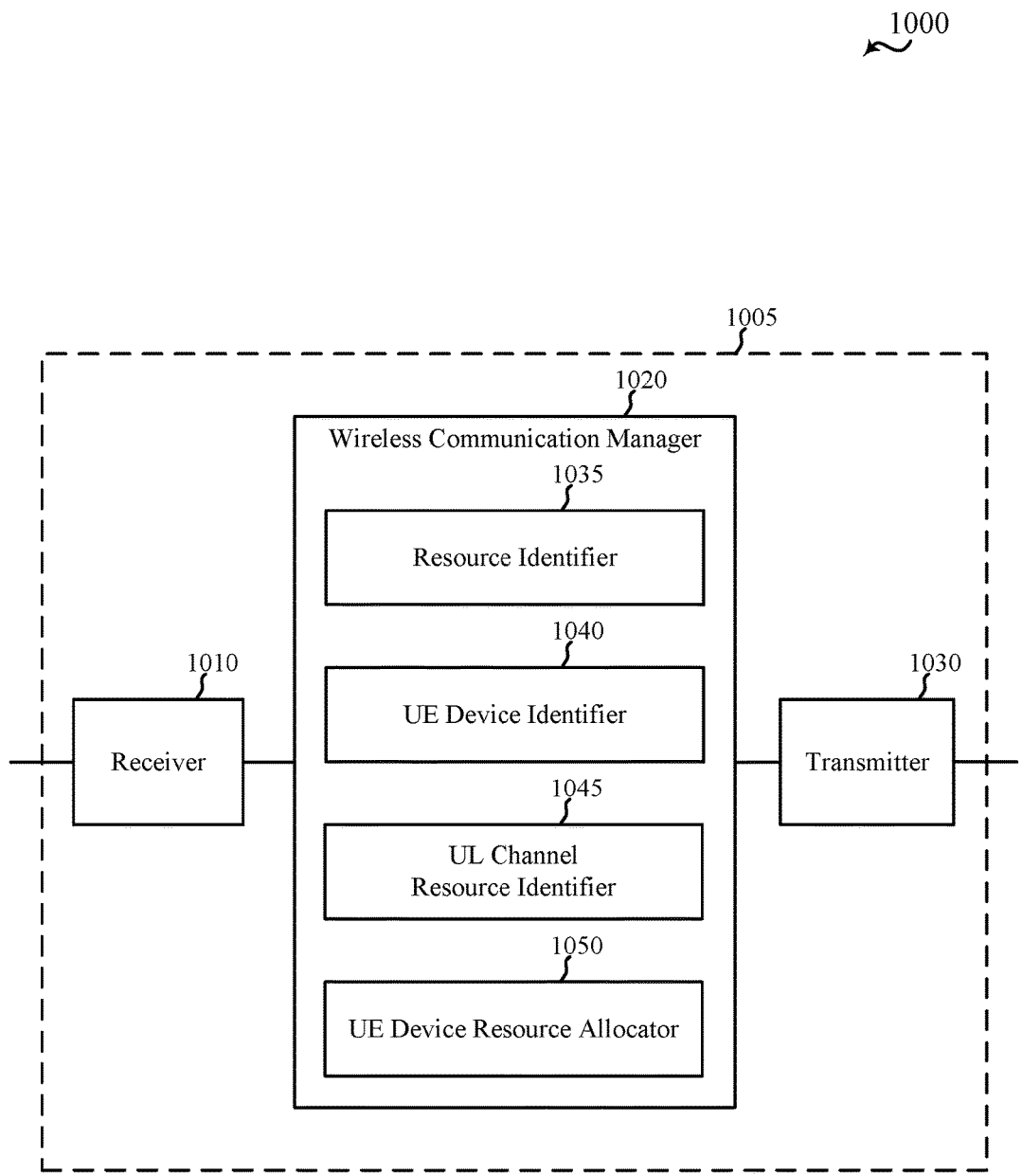
FIG. 10 shows a diagram of a device for use in wireless communication, in accordance with various aspects of the present disclosure.

FIG. 10 shows a diagram 1000 of a device 1005 for use in wireless communication, in accordance with various aspects of the present disclosure. The device 1005 may be an example of aspects of one or more of the base stations 105 described with reference to FIGS. 1 and 2. The device 1005 may also be or include a processor. The device 1005 may include a receiver 1010, a wireless communication manager 1020, or a transmitter 1030. Each of these components may be in communication with each other.

The components of the device 1005 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, Field Programmable Gate Arrays (FPGAs), a System on Chip (SoC), and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1010 may include at least one radio frequency (RF) receiver, such as at least one RF receiver operable to receive transmissions over at least one radio frequency spectrum band. In some examples, one or more of the at least one radio frequency spectrum band may be used for narrowband communications (e.g., NB-LTE communications), as described, for example, with reference to FIGS. 1-9. The receiver 1010 may be used to receive various data or control signals over one or more communication links of a wireless communication system, such as one or more communication links of the wireless communication system 100 or 200 described with reference to FIG. 1 or 2.

In some examples, the transmitter 1030 may include at least one RF transmitter, such as at least one RF transmitter operable to transmit over at least one radio frequency spectrum band. The transmitter 1030 may be used to transmit various data or control signals over one or more communication links of a wireless communication system, such as one or more communication links of the wireless communication system 100 or 200 described with reference to FIG. 1 or 2.

In some examples, the wireless communication manager 1020 may be used to manage one or more aspects of wireless communication for the device 1005. In some examples, part of the wireless communication manager 1020 may be incorporated into or shared with the receiver 1010 or the transmitter 1030. In some examples, the wireless communication manager 1020 may include a resource identifier 1035, a UE device identifier 1040, a UL channel resource allocator 1045, or a UE device resource allocator 1050.

The resource identifier 1035 may be used to identify time resources and frequency resources for narrowband communication in each subframe of a plurality of subframes. The identified resources may include out-of-band resources or in-band resources, as described with reference to FIG. 3. The UE device identifier 1040 may be used to identify a plurality of UE devices (e.g., UE devices needing uplink resources for narrowband communications). The UL channel resource allocator 1045 may be used to allocate at least a first portion of the time resources and the frequency resources to a UL channel. In some examples, a same set of frequency resources may be allocated to the UL channel for a first slot and a second slot of each subframe in the plurality of subframes. In some examples, a same set of frequency resources or a different set of frequency resources may be allocated to the UL channel from one subframe to another subframe in the plurality of subframes. The UE device resource allocator 1050 may be used to allocate resources of the UL channel to the identified plurality of UE devices. In some examples, the UL channel may be an example of a UL control channel such as a dedicated PUCCH.

Figure 11:
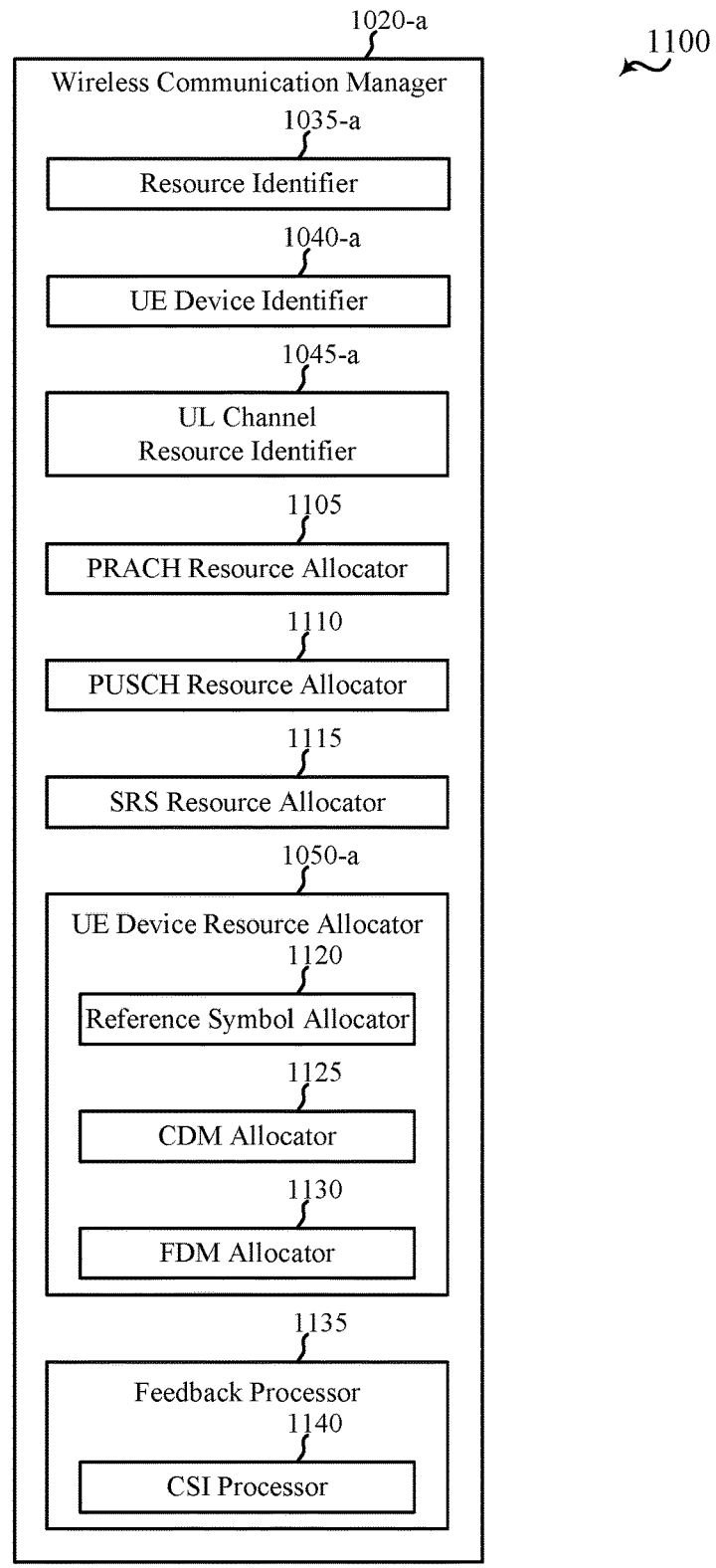
FIG. 11 shows a diagram of a wireless communication manager, in accordance with various aspects of the present disclosure.

FIG. 11 shows a diagram 1100 of a wireless communication manager 1020-*a*, in accordance with various aspects of the present disclosure. The wireless communication manager 1020-*a* may be an alternative to the wireless communication manager 1020 described with reference to FIG. 10, or may be provided in one or more of the base stations 105 described with reference to FIGS. 1 and 2. The wireless communication manager 1020-*a* may be used to manage one or more aspects of wireless communication for a base station. In some examples, part of the wireless communication manager 1020-*a* may be incorporated into or shared with a receiver or a transmitter of a device, such as the receiver 1010 or the transmitter 1030 of the device 1005 described with reference to FIG. 10. In some examples, the wireless communication manager 1020-*a* may include a resource identifier 1035-*a*, a UE device identifier 1040-*a*, a UL channel resource allocator 1045-*a*, or a UE device resource allocator 1050-*a*, which may be examples of the resource identifier 1035, the UE device identifier 1040, the UL channel resource allocator 1045, or the UE device resource allocator 1050 described with reference to FIG. 10. The wireless communication manager 1020-*a* may also include a PRACH resource allocator 1105, a PUSCH resource allocator 1110, a SRS resource allocator 1115, or a feedback processor 1135.

The components of the wireless communication manager 1020-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

The resource identifier 1035-*a* may be used to identify time resources and frequency resources for narrowband communication in each subframe of a plurality of subframes. The identified resources may include out-of-band resources or in-band resources, as described with reference to FIG. 3.

The UE device identifier 1040-*a* may be used to identify a plurality of UE devices (e.g., UE devices needing uplink resources for narrowband communications).

The UL channel resource allocator 1045-*a* may be used to allocate at least a first portion of the time resources and the frequency resources to a UL channel. In some examples, a same set of frequency resources may be allocated to the UL channel for a first slot and a second slot of each subframe in the plurality of subframes. In some examples, a same set of frequency resources or a different set of frequency resources may be allocated to the UL channel from one subframe to another subframe in the plurality of subframes. In some examples, the UL channel may be an example of a UL control channel such as a dedicated PUCCH.

The PRACH resource allocator 1105 may be used to allocate a second portion of the time resources and the frequency resources to a PRACH. The PUSCH resource allocator 1110 may be used to allocate a third portion of the time resources and the frequency resources to a PUSCH.

The SRS resource allocator 1115 may be used to allocate a fourth portion of the time resources and the frequency resources to a SRS. In some examples, a combination of two or more of the UL channel resource allocator 1045-*a*, the PRACH resource allocator 1105, the PUSCH resource allocator 1110, or the SRS resource allocator 1115 may multiplex the UL channel, the PRACH, the PUSCH, or the SRS in the time domain (on the time resources identified for narrowband communication), the frequency domain (on the frequency resources identified for narrowband communication), or a combination thereof.

In some examples, the SRS resource allocator 1115 may allocate resources for transmitting the SRS in each symbol period of each of the plurality of subframes. In some examples, the SRS resource allocator 1115 may allocate resources for transmitting the SRS in a last symbol period of each subframe in which resources are allocated to the UL channel or the PUSCH.

The UE device resource allocator 1050-*a* may be used to allocate resources of the UL channel to the identified plurality of UE devices. In some examples, resources of the UL channel may be allocated to the plurality of UE devices using intra-resource block frequency hopping. In some examples, resources of the UL channel may be additionally or alternatively allocated to a UE device of the plurality of UE devices based at least in part on a CE level associated with the UE device. In some examples, the resources of the UL channel allocated to the plurality of UE devices may include bundled TTIs.

In some examples, the UE device resource allocator 1050-*a* may include a reference symbol allocator 1120, a CDM allocator 1125, or a FDM allocator 1130. The reference symbol allocator 1120 may be used to optionally allocate a same number of resources of the UL channel to reference symbol transmissions and data symbol transmissions.

In some examples, the CDM allocator 1125 may be used to allocate resources of the UL channel to the plurality of UE devices using cross-slot CDM in a time domain and CDM in a frequency domain. Alternatively, the CDM allocator 1125 and the FDM allocator 1130 may be used to allocate resources of the UL channel to the plurality of UE devices using cross-slot CDM in the time domain and FDM. In some examples, the cross-slot CDM in the time domain may include cross-subframe CDM in the time domain.

The feedback processor 1135 may be used to receive at least one of downlink ACKs, downlink NAKs, CQI, or a combination thereof from the plurality of UE devices. The downlink ACKs, downlink NAKs, or CQI may be received on the UL channel. When resources of the UL channel are allocated to the plurality of UE devices using cross-slot CDM in a time domain and CDM in a frequency domain, the downlink ACKs, downlink NAKs, or CQI may be received in a multiple tone transmission from each UE device. When resources of the UL channel are allocated to the plurality of UE devices using cross-slot CDM in the time domain and FDM, the downlink ACKs, downlink NAKs, or CQI may be received in single tone transmissions from each UE device. In some examples, a plurality of single tone transmissions may be received on the UL channel, in parallel, from one or more of the UE devices.

In some examples, the feedback processor 1135 may include a CSI processor 1140. The CSI processor 1140 may be used to determine CSI for at least one downlink of the narrowband communication. The CSI may be determined based at least in part on CQI for the at least one downlink received from one or more of the plurality of UEs devices.

Alternatively, the CSI processor 1140 may be used to approximate CSI for at least one downlink of the narrowband communication. The CSI may be approximated based at least in part on: measurement of a SRS, CQI for an uplink of the narrowband communication, CQI received on a PUSCH, or a combination thereof.

Figure 12:
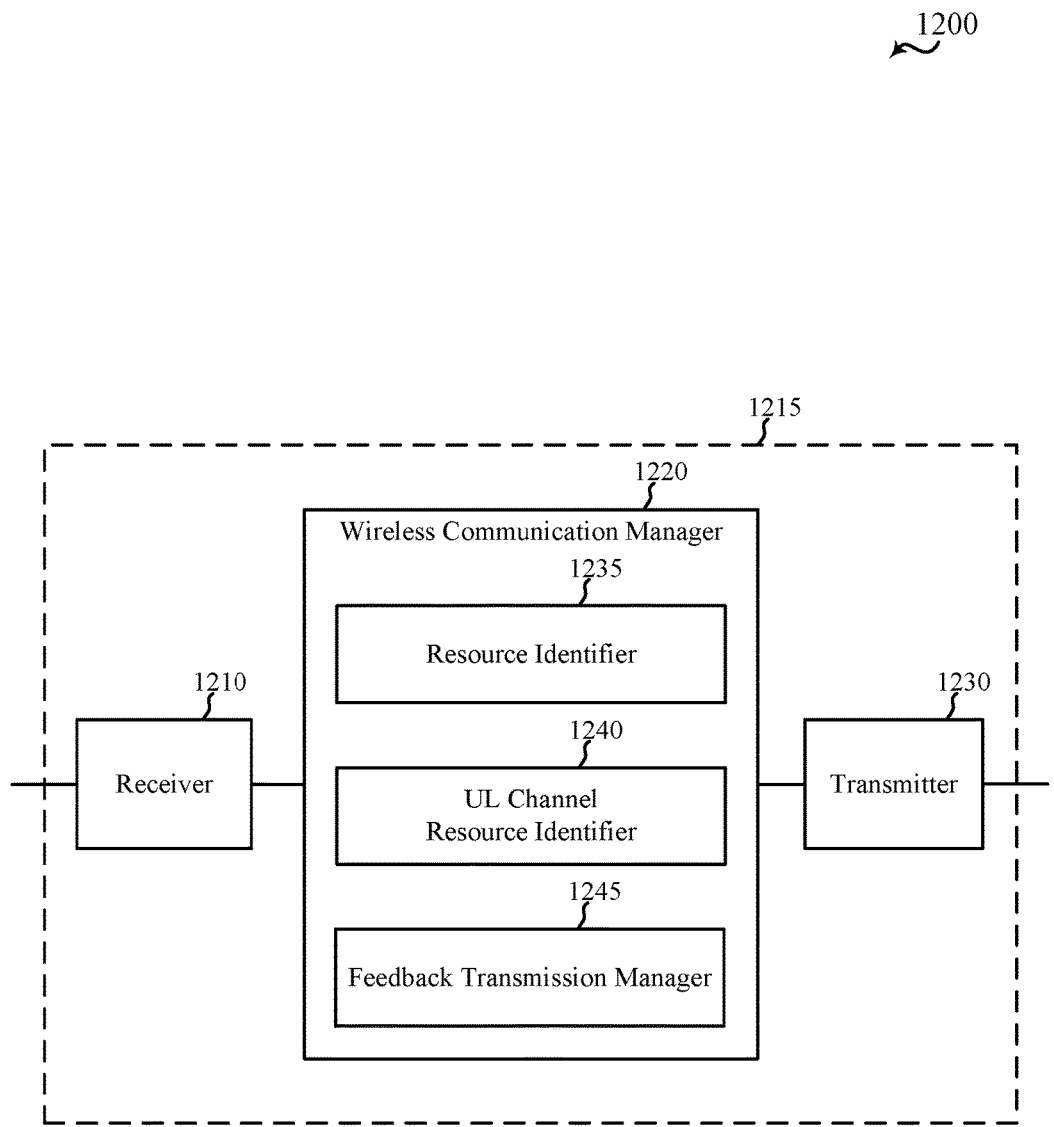
FIG. 12 shows a diagram of a device for use in wireless communication, in accordance with various aspects of the present disclosure.

FIG. 12 shows a diagram 1200 of a device 1215 for use in wireless communication, in accordance with various aspects of the present disclosure. The device 1215 may be an example of aspects of one or more of the UE devices 115 described with reference to FIGS. 1 and 2. The device 1215 may also be or include a processor. The device 1215 may include a receiver 1210, a wireless communication manager 1220, or a transmitter 1230. Each of these components may be in communication with each other.

The components of the device 1215 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1210 may include at least one RF receiver, such as at least one RF receiver operable to receive transmissions over at least one radio frequency spectrum band. In some examples, one or more of the at least one radio frequency spectrum band may be used for narrowband communications (e.g., NB-LTE communications), as described, for example, with reference to FIGS. 1-9. The receiver 1210 may be used to receive various data or control signals over one or more communication links of a wireless communication system, such as one or more communication links of the wireless communication system 100 or 200 described with reference to FIG. 1 or 2.

In some examples, the transmitter 1230 may include at least one RF transmitter, such as at least one RF transmitter operable to transmit over at least one radio frequency spectrum band. The transmitter 1230 may be used to transmit various data or control signals over one or more communication links of a wireless communication system, such as one or more communication links of the wireless communication system 100 or 200 described with reference to FIG. 1 or 2.

In some examples, the wireless communication manager 1220 may be used to manage one or more aspects of wireless communication for the device 1215. In some examples, part of the wireless communication manager 1220 may be incorporated into or shared with the receiver 1210 or the transmitter 1230. In some examples, the wireless communication manager 1220 may include a resource identifier 1235, a UL channel resource identifier 1240, or a feedback transmission manager 1245.

The resource identifier 1235 may be used to identify time resources and frequency resources for narrowband communication in each subframe of a plurality of subframes. The identified resources may include out-of-band resources or in-band resources, as described with reference to FIG. 3. The UL channel resource identifier 1240 may be used to receive an indication of at least a first portion of the time resources and the frequency resources allocated to a UL channel for the UE device. The feedback transmission manager 1245 may be used to transmit at least one of downlink ACKs, downlink NAKs, CQI, or a combination thereof on the UL channel. In some cases, the UL channel may be an example of a UL control channel such as a dedicated PUCCH.

Figure 13:
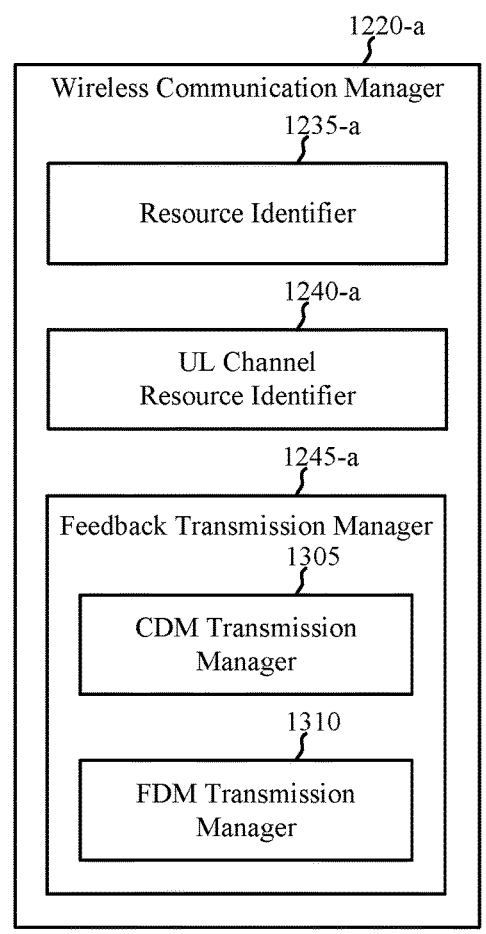
FIG. 13 shows a diagram of a wireless communication manager, in accordance with various aspects of the present disclosure.

FIG. 13 shows a diagram 1300 of a wireless communication manager 1220-*a*, in accordance with various aspects of the present disclosure. The wireless communication manager 1220-*a* may be an alternative to the wireless communication manager 1220 described with reference to FIG. 12, or may be provided in one or more of the UE devices 115 described with reference to FIGS. 1 and 2. The wireless communication manager 1220-*a* may be used to manage one or more aspects of wireless communication for a UE device. In some examples, part of the wireless communication manager 1220-*a* may be incorporated into or shared with a receiver or a transmitter of a device, such as the receiver 1210 or the transmitter 1230 of the device 1215 described with reference to FIG. 12. In some examples, the wireless communication manager 1220-*a* may include a resource identifier 1235-*a*, a UL channel resource identifier 1240-*a*, or a feedback transmission manager 1245-*a*, which may be examples of the resource identifier 1235, the UL channel resource identifier 1240, or the feedback transmission manager 1245 described with reference to FIG. 12.

The components of the wireless communication manager 1220-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

The resource identifier 1235-*a* may be used to identify time resources and frequency resources for narrowband communication in each subframe of a plurality of subframes. The identified resources may include out-of-band resources or in-band resources, as described with reference to FIG. 3.

The UL channel resource identifier 1240-*a* may be used to receive an indication of at least a first portion of the time resources and the frequency resources allocated to a UL channel for the UE device. In some cases, the UL channel may be an example of a UL control channel such as a dedicated PUCCH.

The feedback transmission manager 1245-*a* may be used to transmit at least one of downlink ACKs, downlink NAKs, CQI, or a combination thereof on the UL channel. In some examples, the feedback transmission manager 1245-*a* may include a CDM transmission manager 1305 or a FDM transmission manager 1310. In some examples, the CDM transmission manager 1305 may be used to transmit the downlink ACKs, downlink NAKs, and/or CQI on the UL channel using cross-slot CDM in a time domain and CDM in a frequency domain. Alternatively, the CDM transmission manager 1305 and FDM transmission manager 1310 may be used to transmit the downlink ACKs, downlink NAKs, and/or CQI on the UL channel using cross-slot CDM in the time domain and FDM. In some examples, the cross-slot CDM in the time domain may include cross-subframe CDM in the time domain.

In some examples of the device 1215, the feedback transmission manager 1245-a may be used to transmit a same number of reference symbols and data symbols on the UL channel.

Figure 14:
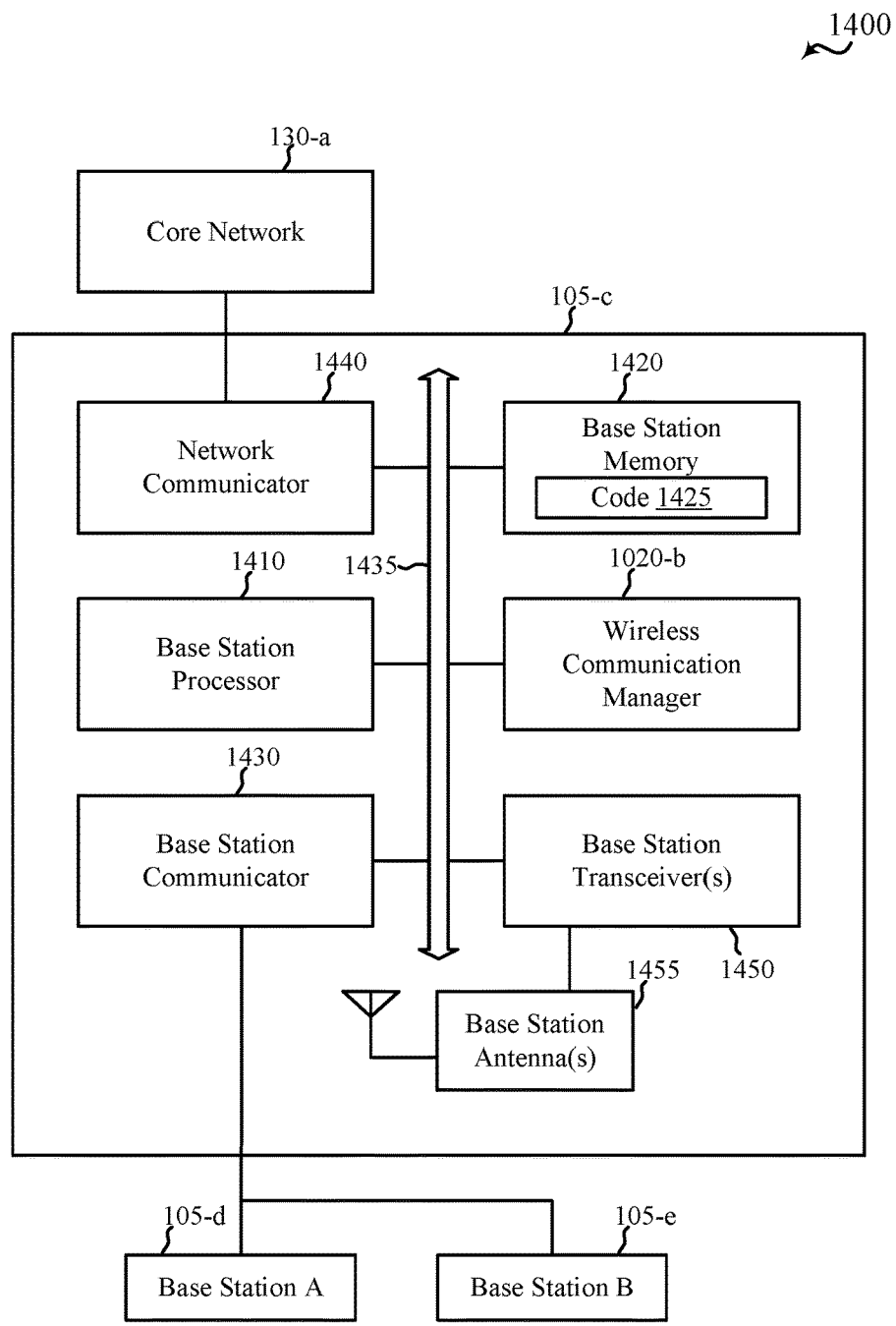
FIG. 14 shows a diagram of a base station (e.g., a base station forming part or all of an eNB) for use in wireless communication, in accordance with various aspects of the present disclosure.

FIG. 14 shows a diagram 1400 of a base station 105-c (e.g., a base station forming part or all of an eNB) for use in wireless communication, in accordance with various aspects of the present disclosure. In some examples, the base station 105-c may be an example of aspects of one or more of the base stations 105 or the devices 1005 described with reference to FIGS. 1, 2, and 10. The base station 105-c may be configured to implement or facilitate at least some of the base station features and functions described with reference to FIGS. 1-11.

The base station 105-c may include a base station processor 1410, a base station memory 1420, at least one base station transceiver (represented by base station transceiver(s) 1450), at least one base station antenna (represented by base station antenna(s) 1455), or a wireless communication manager 1020-b. The base station 105-c may also include one or more of a base station communicator 1430 or a network communicator 1440. Each of these components may be in communication with each other, directly or indirectly, over one or more buses 1435.

The base station memory 1420 may include random access memory (RAM) or read-only memory (ROM). The base station memory 1420 may store computer-readable, computer-executable code 1425 containing instructions that are configured to, when executed, cause the base station processor 1410 to perform various functions described herein related to wireless communication, including, for example, allocating resources to UE devices for narrowband communications on a PRACH, a dedicated PUCCH, a PUSCH, or a SRS, as described with reference to FIGS. 1-11. Alternatively, the code 1425 may not be directly executable by the base station processor 1410 but be configured to cause the base station 105-c (e.g., when compiled and executed) to perform various of the functions described herein.

The base station processor 1410 may include an intelligent hardware device, e.g., a central processing unit (CPU), a microcontroller, an ASIC, etc. The base station processor 1410 may process information received through the base station transceiver(s) 1450, the base station communicator 1430, or the network communicator 1440. The base station processor 1410 may also process information to be sent to the transceiver(s) 1450 for transmission through the antenna(s) 1455, to the base station communicator 1430, for transmission to one or more other base stations 105-d and 105-e, or to the network communicator 1440 for transmission to a core network 130-a, which may be an example of one or more aspects of the core network 130 described with reference to FIG. 1. The base station processor 1410 may handle, alone or in connection with the wireless communication manager 1020-b, various aspects of communicating over (or managing communications over) one or more radio frequency spectrum bands.

The base station transceiver(s) 1450 may include a modem configured to modulate packets and provide the modulated packets to the base station antenna(s) 1455 for transmission, and to demodulate packets received from the base station antenna(s) 1455. The base station transceiver(s) 1450 may, in some examples, be implemented as one or more base station transmitters and one or more separate base station receivers. The base station transceiver(s) 1450 may support communication over one or more wireless communication links. The base station transceiver(s) 1450 may be configured to communicate bi-directionally, via the antenna(s) 1455, with one or more UE devices or other devices, such as one or more of the UE devices 115 or devices 1215 described with reference to FIGS. 1, 2, and 12. The base station 105-c may, for example, include multiple base station antennas 1455 (e.g., an antenna array). The base station 105-c may communicate with the core network 130-a through the network communicator 1440. The base station 105-c may also communicate with other base stations, such as the base stations 105-d and 105-e, using the base station communicator 1430.

The wireless communication manager 1020-b may be configured to perform or control some or all of the features or functions described with reference to FIGS. 1-11 related to wireless communication over one or more radio frequency spectrum bands. The wireless communication manager 1020-b, or portions of it, may include a processor, or some or all of the functions of the wireless communication manager 1020-b may be performed by the base station processor 1410 or in connection with the base station processor 1410. In some examples, the wireless communication manager 1020-b may be an example of the wireless communication manager 1020 described with reference to FIGS. 10 and 11.

Figure 15:
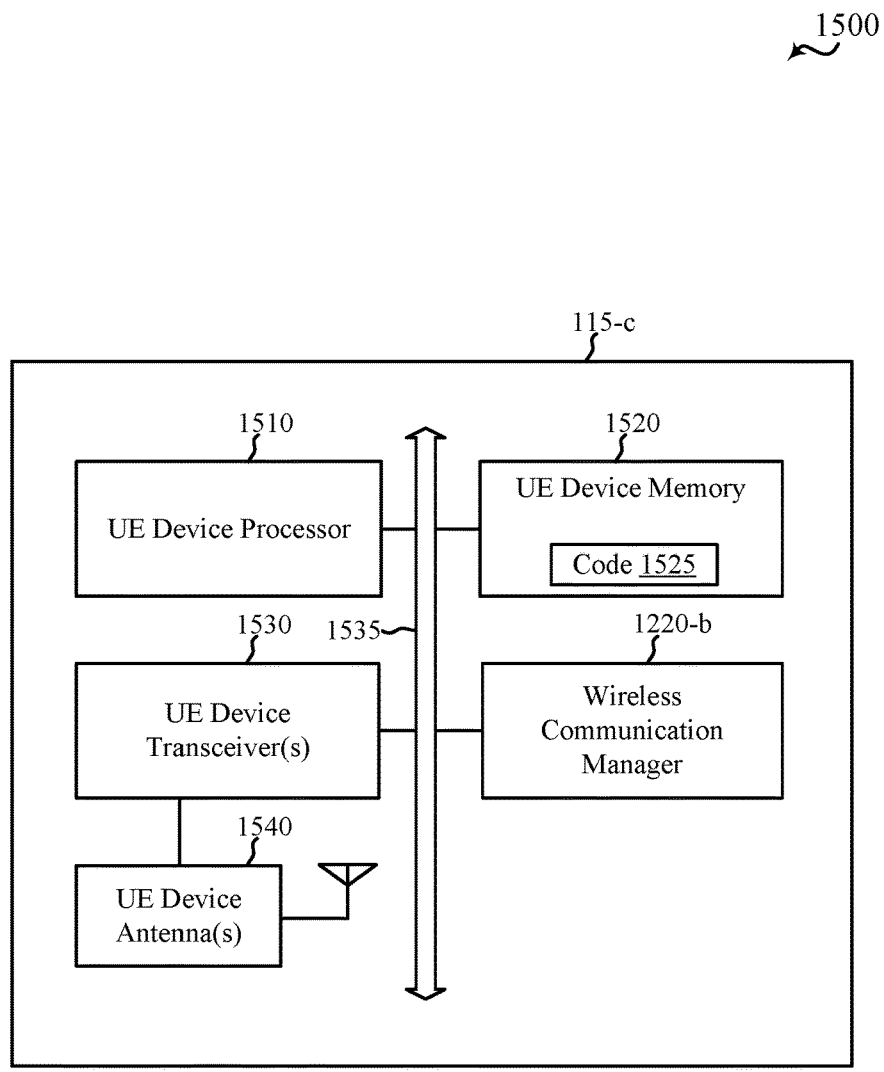
FIG. 15 shows a diagram of a UE device for use in wireless communication, in accordance with various aspects of the present disclosure.

FIG. 15 shows a diagram 1500 of a UE device 115-c for use in wireless communication, in accordance with various aspects of the present disclosure. The UE device 115-c may have various configurations and may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, etc. The UE device 115-c may, in some examples, have an internal power supply (not shown), such as a small battery, to facilitate mobile or remote operation. In some examples, the UE device 115-c may be an example of aspects of one or more of the UE devices 115 or the devices 1215 described with reference to FIGS. 1, 2, and 12. The UE device 115-c may be configured to implement at least some of the UE device features and functions described with reference to FIGS. 1-9, 12, and 13.

The UE device 115-c may include a UE device processor 1510, a UE device memory 1520, at least one UE device transceiver (represented by UE device transceiver(s) 1530), at least one UE device antenna (represented by UE device antenna(s) 1540), or a wireless communication manager 1220-b. Each of these components may be in communication with each other, directly or indirectly, over one or more buses 1535.

The UE device memory 1520 may include RAM or ROM. The UE device memory 1520 may store computer-readable, computer-executable code 1525 containing instructions that are configured to, when executed, cause the UE device processor 1510 to perform various functions described herein related to wireless communication, including, for example, transmitting narrowband communications on a PRACH, a dedicated PUCCH, a PUSCH, or a SRS, as described with reference to FIGS. 1-9, 12, and 13. Alternatively, the code 1525 may not be directly executable by the UE device processor 1510 but be configured to cause the UE device 115-c (e.g., when compiled and executed) to perform various of the functions described herein.

The UE device processor 1510 may include an intelligent hardware device, e.g., a CPU, a microcontroller, an ASIC, etc. The UE device processor 1510 may process information received through the UE device transceiver(s) 1530 or information to be sent to the UE device transceiver(s) 1530 for transmission through the UE device antenna(s) 1540. The UE device processor 1510 may handle, alone or in connection with the wireless communication manager 1220-b, various aspects of communicating over (or managing communications over) one or more radio frequency spectrum bands.

The UE device transceiver(s) 1530 may include a modem configured to modulate packets and provide the modulated packets to the UE device antenna(s) 1540 for transmission, and to demodulate packets received from the UE device antenna(s) 1540. The UE device transceiver(s) 1530 may, in some examples, be implemented as one or more UE device transmitters and one or more separate UE device receivers. The UE device transceiver(s) 1530 may support communications over one or more wireless communication links. The UE device transceiver(s) 1530 may be configured to communicate bi-directionally, via the UE device antenna(s) 1540, with one or more base stations or other devices, such as one or more of the base stations 105 or devices 1005 described with reference to FIGS. 1, 2, and 10. While the UE device 115-c may include a single UE device antenna, there may be examples in which the UE device 115-c may include multiple UE device antennas 1540.

The wireless communication manager 1220-b may be configured to perform or control some or all of the UE device features or functions described with reference to FIGS. 1-9, 12, and 13 related to wireless communication over one or more radio frequency spectrum bands. The wireless communication manager 1220-b, or portions of it, may include a processor, or some or all of the functions of the wireless communication manager 1220-b may be performed by the UE device processor 1510 or in connection with the UE device processor 1510. In some examples, the wireless communication manager 1220-b may be an example of the wireless communication manager 1220 described with reference to FIGS. 12 and 13.

Figure 16:
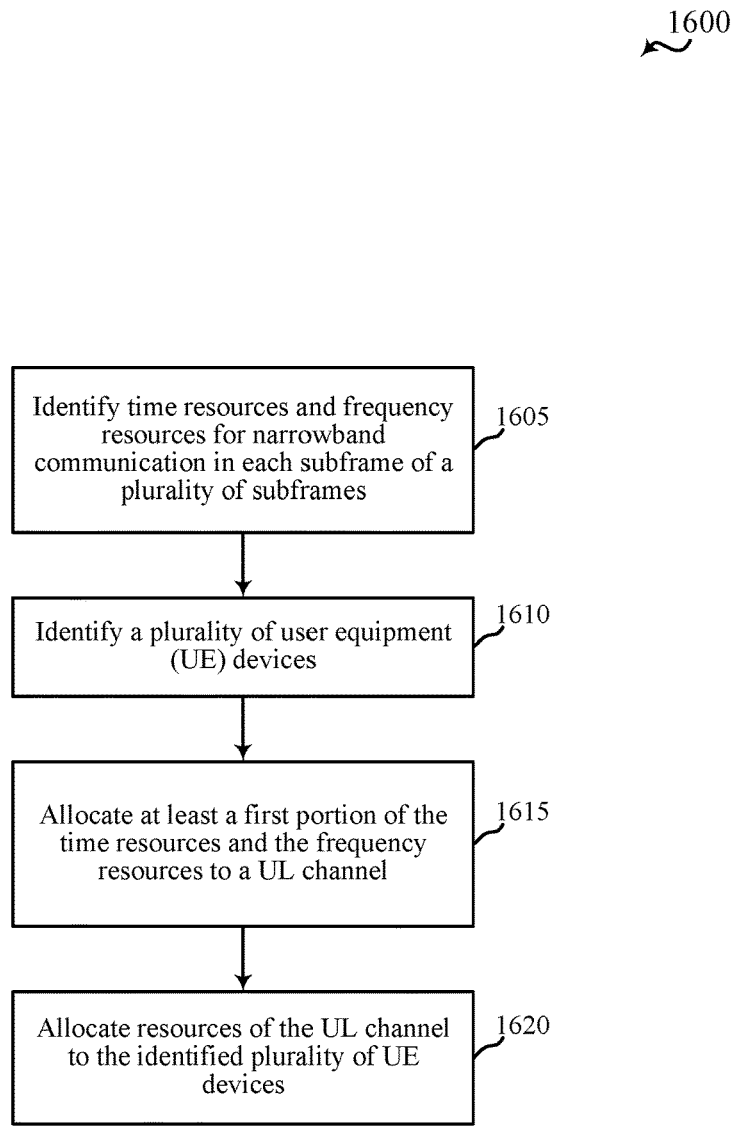
FIG. 16 is a flow chart illustrating an example of a method for wireless communication at a base station, in accordance with various aspects of the present disclosure.

FIG. 16 is a flow chart illustrating an example of a method 1600 for wireless communication at a base station, in accordance with various aspects of the present disclosure. For clarity, the method 1600 is described below with reference to aspects of one or more of the base stations 105 described with reference to FIGS. 1, 2, and 14, aspects of the device 1005 described with reference to FIG. 10, or aspects of one or more of the wireless communication managers 1020 described with reference to FIGS. 10, 11, and 14. In some examples, a base station may execute one or more sets of codes to control the functional elements of the base station to perform the functions described below. Additionally or alternatively, the base station may perform one or more of the functions described below using special-purpose hardware.

At block 1605, the method 1600 may include identifying time resources and frequency resources for narrowband communication in each subframe of a plurality of subframes. The identified resources may include out-of-band resources or in-band resources, as described with reference to FIG. 3. The operation(s) at block 1605 may be performed using the wireless communication manager 1020 described with reference to FIGS. 10, 11, and 14, or the resource identifier 1035 described with reference to FIGS. 10 and 11.

At block 1610, the method 1600 may include identifying a plurality of UE devices (e.g., UE devices needing uplink resources for narrowband communications). The operation(s) at block 1610 may be performed using the wireless communication manager 1020 described with reference to FIGS. 10, 11, and 14, or the UE device identifier 1040 described with reference to FIGS. 10 and 11.

At block 1615, the method 1600 may include allocating at least a first portion of the time resources and the frequency resources to a UL channel. In some examples, a same set of frequency resources may be allocated to the UL channel for a first slot and a second slot of each subframe in the plurality of subframes. In some examples, a same set of frequency resources or a different set of frequency resources may be allocated to the UL channel from one subframe to another subframe in the plurality of subframes. In some cases, the UL channel may be an example of a UL control channel such as a dedicated PUCCH. The operation(s) at block 1615 may be performed using the wireless communication manager 1020 described with reference to FIGS. 10, 11, and 14, or the UL channel resource allocator 1045 described with reference to FIGS. 10 and 11.

At block 1620, the method 1600 may include allocating resources of the UL channel to the identified plurality of UE devices. In some examples, resources of the UL channel may be allocated to the plurality of UE devices using intra-resource block frequency hopping. In some examples, resources of the UL channel may be additionally or alternatively allocated to a UE device of the plurality of UE devices based at least in part on a CE level associated with the UE device. In some examples, the resources of the UL channel allocated to the plurality of UE devices may include bundled TTIs. The operation(s) at block 1620 may be performed using the wireless communication manager 1020 described with reference to FIGS. 10, 11, and 14, or the UE device resource allocator 1050 described with reference to FIGS. 10 and 11.

Thus, the method 1600 may provide for wireless communication. It should be noted that the method 1600 is just one implementation and that the operations of the method 1600 may be rearranged or otherwise modified such that other implementations are possible.

Figure 17:
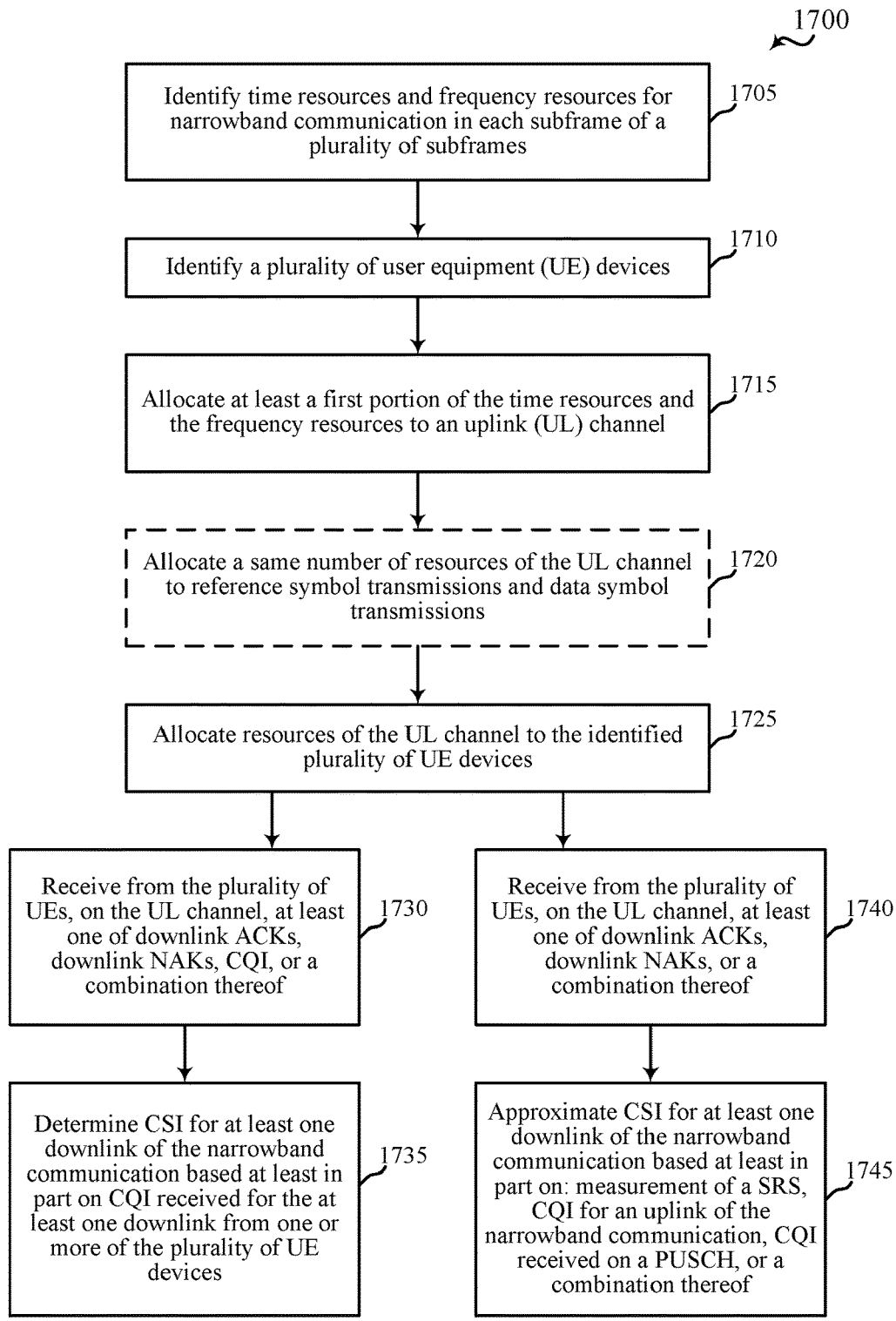
FIG. 17 is a flow chart illustrating an example of a method for wireless communication at a base station, in accordance with various aspects of the present disclosure.

FIG. 17 is a flow chart illustrating an example of a method 1700 for wireless communication at a base station, in accordance with various aspects of the present disclosure. For clarity, the method 1700 is described below with reference to aspects of one or more of the base stations 105 described with reference to FIGS. 1, 2, and 14, aspects of the device 1005 described with reference to FIG. 10, or aspects of one or more of the wireless communication managers 1020 described with reference to FIGS. 10, 11, and 14. In some examples, a base station may execute one or more sets of codes to control the functional elements of the base station to perform the functions described below. Additionally or alternatively, the base station may perform one or more of the functions described below using special-purpose hardware.

At block 1705, the method 1700 may include identifying time resources and frequency resources for narrowband communication in each subframe of a plurality of subframes. The identified resources may include out-of-band resources or in-band resources, as described with reference to FIG. 3. The operation(s) at block 1705 may be performed using the wireless communication manager 1020 described with reference to FIGS. 10, 11, and 14, or the resource identifier 1035 described with reference to FIGS. 10 and 11.

At block 1710, the method 1700 may include identifying a plurality of UE devices (e.g., UE devices needing uplink resources for narrowband communications). The operation(s) at block 1710 may be performed using the wireless communication manager 1020 described with reference to FIGS. 10, 11, and 14, or the UE device identifier 1040 described with reference to FIGS. 10 and 11.

At block 1715, the method 1700 may include allocating at least a first portion of the time resources and the frequency resources to a UL channel. In some examples, a same set of frequency resources may be allocated to the UL channel for a first slot and a second slot of each subframe in the plurality of subframes. In some examples, a same set of frequency resources or a different set of frequency resources may be allocated to the UL channel from one subframe to another subframe in the plurality of subframes. In some cases, the UL channel may be an example of a UL control channel such as a dedicated PUCCH. The operation(s) at block 1715 may be performed using the wireless communication manager 1020 described with reference to FIGS. 10, 11, and 14, or the UL channel resource allocator 1045 described with reference to FIGS. 10 and 11.

At block 1720, the method 1700 may optionally include allocating a same number of resources of the UL channel to reference symbol transmissions and data symbol transmissions. The operation(s) at block 1720 may be performed using the wireless communication manager 1020 described with reference to FIGS. 10, 11, and 14, the UE device resource allocator 1050 described with reference to FIG. 10, or the reference symbol allocator 1120 described with reference to FIG. 11.

At block 1725, the method 1700 may include allocating resources of the UL channel to the identified plurality of UE devices. In some examples, resources of the UL channel may be allocated to the plurality of UE devices using intra-resource block frequency hopping. In some examples, resources of the UL channel may be additionally or alternatively allocated to a UE device of the plurality of UE devices based at least in part on a CE level associated with the UE device. In some examples, the resources of the UL channel allocated to the plurality of UE devices may include bundled TTIs. The operation(s) at block 1725 may be performed using the wireless communication manager 1020 described with reference to FIGS. 10, 11, and 14, or the UE device resource allocator 1050 described with reference to FIGS. 10 and 11.

Following the operation(s) at block 1725, the method 1700 may continue at block 1730 or block 1740. At block 1730, the method 1700 may include receiving from the plurality of UE devices, on the UL channel, at least one of downlink ACKs, downlink NAKs, CQI, or a combination thereof. The operation(s) at block 1730 may be performed using the wireless communication manager 1020 described with reference to FIGS. 10, 11, and 14, or the feedback processor 1135 described with reference to FIG. 11.

At block 1735, the method 1700 may include determining CSI for at least one downlink of the narrowband communication based at least in part on CQI received for the at least one downlink from one or more of the plurality of UE devices (e.g., at block 1730). The operation(s) at block 1735 may be performed using the wireless communication manager 1020 described with reference to FIGS. 10, 11, and 14, or the CSI processor 1140 described with reference to FIG. 11.

At block 1740, the method 1700 may include receiving from the plurality of UE devices, on the UL channel, at least one of downlink ACKs, downlink NAKs, or a combination thereof. The operation(s) at block 1740 may be performed using the wireless communication manager 1020 described with reference to FIGS. 10, 11, and 14, or the feedback processor 1135 described with reference to FIG. 11.

At block 1745, the method 1700 may include approximating CSI for at least one downlink of the narrowband communication based at least in part on: measurement of a SRS, CQI for an uplink of the narrowband communication, CQI received on a PUSCH, or a combination thereof. The operation(s) at block 1745 may be performed using the wireless communication manager 1020 described with reference to FIGS. 10, 11, and 14, or the CSI processor 1140 described with reference to FIG. 11.

Thus, the method 1700 may provide for wireless communication. It should be noted that the method 1700 is just one implementation and that the operations of the method 1700 may be rearranged or otherwise modified such that other implementations are possible.

Figure 18:
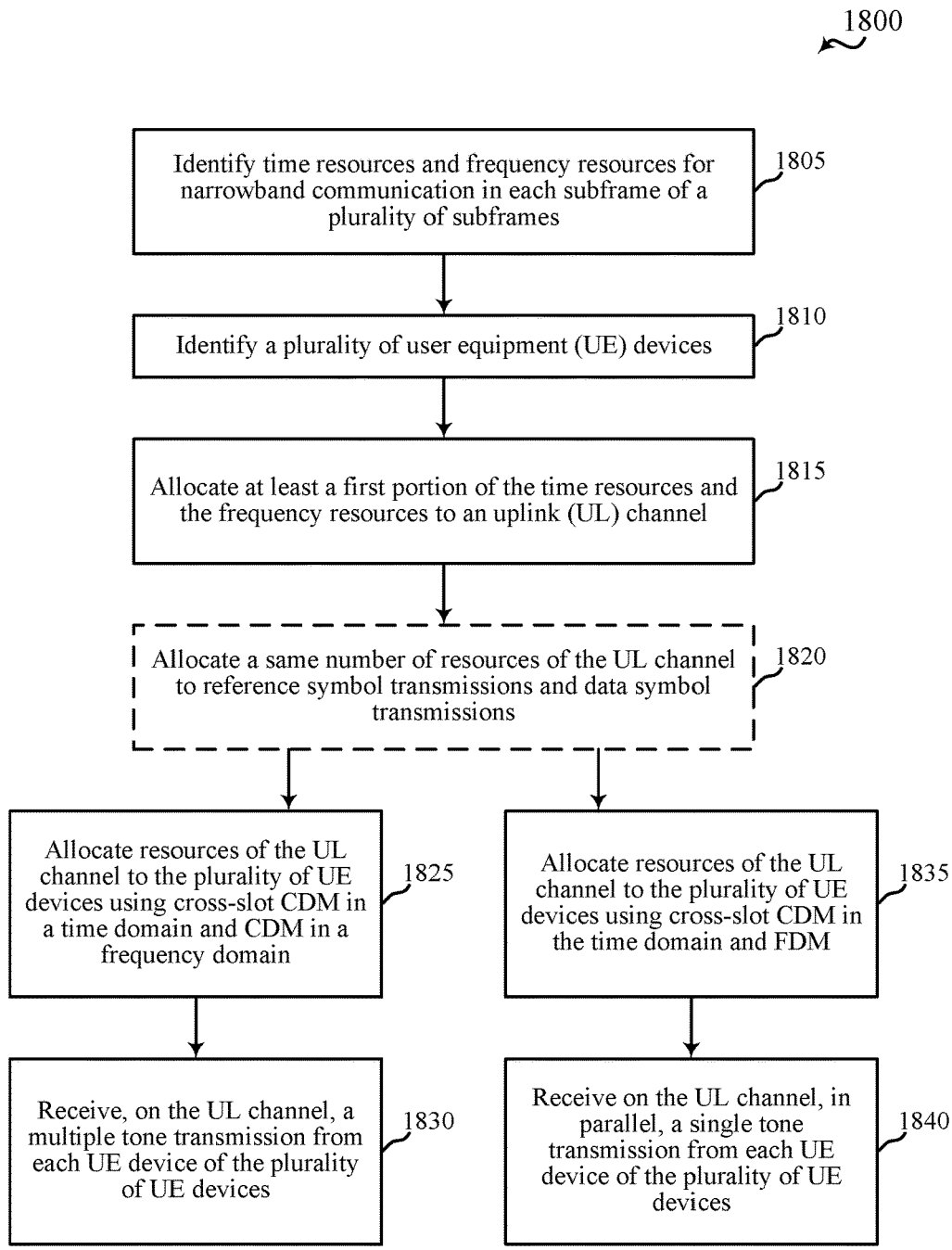
FIG. 18 is a flow chart illustrating an example of a method for wireless communication at a base station, in accordance with various aspects of the present disclosure.

FIG. 18 is a flow chart illustrating an example of a method 1800 for wireless communication at a base station, in accordance with various aspects of the present disclosure. For clarity, the method 1800 is described below with reference to aspects of one or more of the base stations 105 described with reference to FIGS. 1, 2, and 14, aspects of the device 1005 described with reference to FIG. 10, or aspects of one or more of the wireless communication managers 1020 described with reference to FIGS. 10, 11, and 14. In some examples, a base station may execute one or more sets of codes to control the functional elements of the base station to perform the functions described below. Additionally or alternatively, the base station may perform one or more of the functions described below using special-purpose hardware.

At block 1805, the method 1800 may include identifying time resources and frequency resources for narrowband communication in each subframe of a plurality of subframes. The identified resources may include out-of-band resources or in-band resources, as described with reference to FIG. 3. The operation(s) at block 1805 may be performed using the wireless communication manager 1020 described with reference to FIGS. 10, 11, and 14, or the resource identifier 1035 described with reference to FIGS. 10 and 11.

At block 1810, the method 1800 may include identifying a plurality of UE devices (e.g., UE devices needing uplink resources for narrowband communications). The operation(s) at block 1810 may be performed using the wireless communication manager 1020 described with reference to FIGS. 10, 11, and 14, or the UE device identifier 1040 described with reference to FIGS. 10 and 11.

At block 1815, the method 1800 may include allocating at least a first portion of the time resources and the frequency resources to a UL channel. In some examples, a same set of frequency resources may be allocated to the UL channel for a first slot and a second slot of each subframe in the plurality of subframes. In some examples, a same set of frequency resources or a different set of frequency resources may be allocated to the UL channel from one subframe to another subframe in the plurality of subframes. In some cases, the UL channel may be an example of a UL control channel such as a dedicated PUCCH. The operation(s) at block 1815 may be performed using the wireless communication manager 1020 described with reference to FIGS. 10, 11, and 14, or the UL channel resource allocator 1045 described with reference to FIGS. 10 and 11.

At block 1820, the method 1800 may optionally include allocating a same number of resources of the UL channel to reference symbol transmissions and data symbol transmissions. The operation(s) at block 1820 may be performed using the wireless communication manager 1020 described with reference to FIGS. 10, 11, and 14, the UE device resource allocator 1050 described with reference to FIG. 10, or the reference symbol allocator 1120 described with reference to FIG. 11.

Following the operation(s) at block 1820, the method 1800 may continue at block 1825 or block 1835. At block 1825 or 1835, the method 1800 may include allocating resources of the UL channel to the identified plurality of UE devices. In some examples, resources of the UL channel may be allocated to the plurality of UE devices using intra-resource block frequency hopping. In some examples, resources of the UL channel may be additionally or alternatively allocated to a UE device of the plurality of UE devices based at least in part on a CE level associated with the UE device. In some examples, the resources of the UL channel allocated to the plurality of UE devices may include bundled TTIs.

At block 1825, the method 1800 may include allocating resources of the UL channel to the plurality of UE devices using cross-slot CDM in a time domain and CDM in a frequency domain. In some examples, the cross-slot CDM in the time domain may include cross-subframe CDM in the time domain. The operation(s) at block 1825 may be performed using the wireless communication manager 1020 described with reference to FIGS. 10, 11, and 14, the UE device resource allocator 1050 described with reference to FIGS. 10 and 11, or the CDM allocator 1125 described with reference to FIG. 11.

At block 1830, the method 1800 may include receiving, on the UL channel, a multiple tone transmission from each UE device of the plurality of UE devices. The operation(s) at block 1830 may be performed using the wireless communication manager 1020 described with reference to FIGS. 10, 11, and 14, or the feedback processor 1135 described with reference to FIG. 11.

At block 1835, the method 1800 may include allocating resources of the UL channel to the plurality of UE devices using cross-slot CDM in the time domain and FDM. In some examples, the cross-slot CDM in the time domain may include cross-subframe CDM in the time domain. The operation(s) at block 1835 may be performed using the wireless communication manager 1020 described with reference to FIGS. 10, 11, and 14, the UE device resource allocator 1050 described with reference to FIGS. 10 and 11, or the CDM allocator 1125 or FDM allocator 1130 described with reference to FIG. 11.

At block 1840, the method 1800 may include receiving on the UL channel, in parallel, a single tone transmission from each UE device of the plurality of UE devices. In some examples, a plurality of single tone transmissions may be received on the UL channel, in parallel, from one or more of the UE devices. The operation(s) at block 1830 may be performed using the wireless communication manager 1020 described with reference to FIGS. 10, 11, and 14, or the feedback processor 1135 described with reference to FIG. 11.

Thus, the method 1800 may provide for wireless communication. It should be noted that the method 1800 is just one implementation and that the operations of the method 1800 may be rearranged or otherwise modified such that other implementations are possible.

Figure 19:
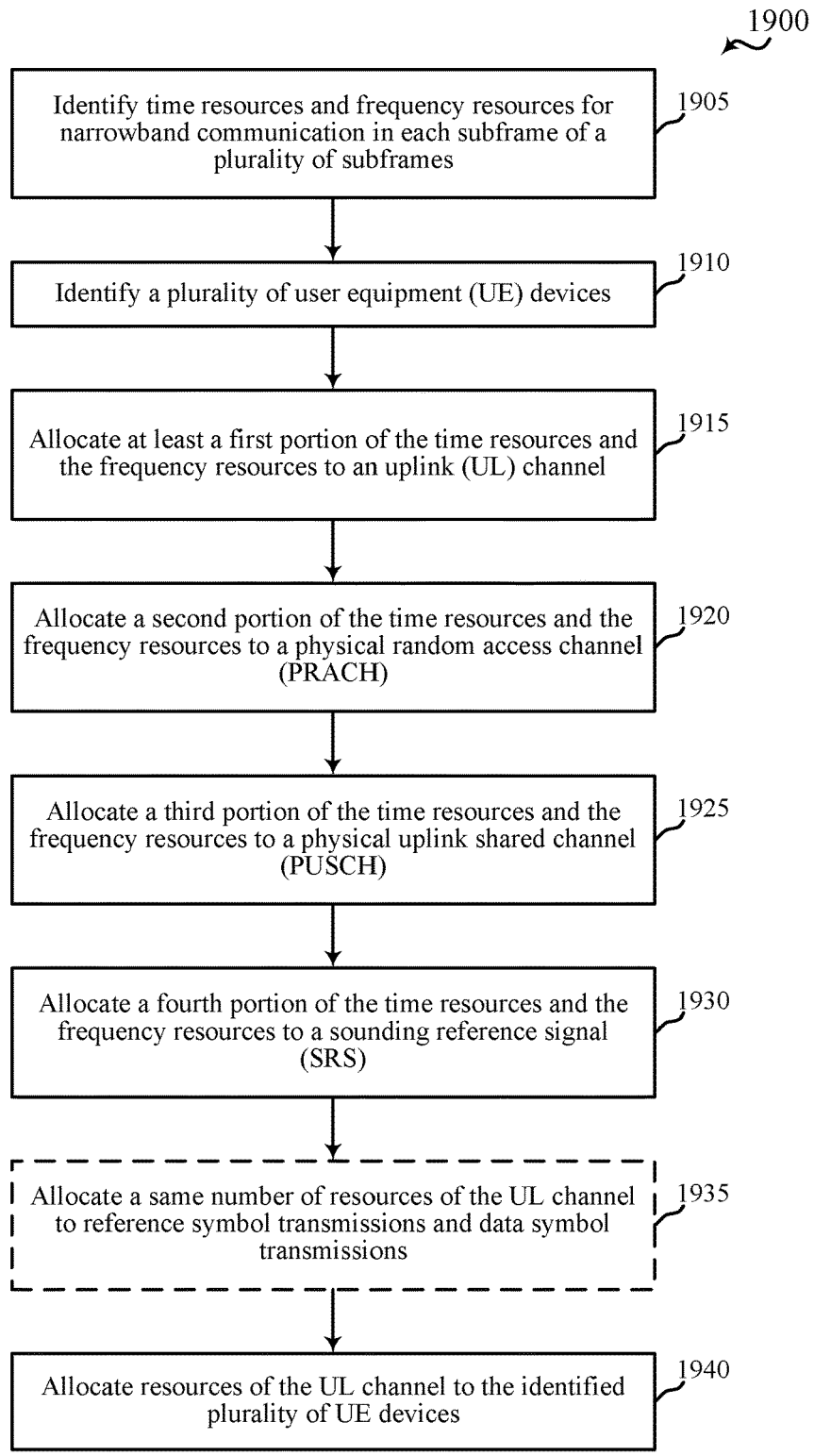
FIG. 19 is a flow chart illustrating an example of a method for wireless communication at a base station, in accordance with various aspects of the present disclosure.

FIG. 19 is a flow chart illustrating an example of a method 1900 for wireless communication at a base station, in accordance with various aspects of the present disclosure. For clarity, the method 1900 is described below with reference to aspects of one or more of the base stations 105 described with reference to FIGS. 1, 2, and 14, aspects of the device 1005 described with reference to FIG. 10, or aspects of one or more of the wireless communication managers 1020 described with reference to FIGS. 10, 11, and 14. In some examples, a base station may execute one or more sets of codes to control the functional elements of the base station to perform the functions described below. Additionally or alternatively, the base station may perform one or more of the functions described below using special-purpose hardware.

At block 1905, the method 1900 may include identifying time resources and frequency resources for narrowband communication in each subframe of a plurality of subframes. The identified resources may include out-of-band resources or in-band resources, as described with reference to FIG. 3. The operation(s) at block 1905 may be performed using the wireless communication manager 1020 described with reference to FIGS. 10, 11, and 14, or the resource identifier 1035 described with reference to FIGS. 10 and 11.

At block 1910, the method 1900 may include identifying a plurality of UE devices (e.g., UE devices needing uplink resources for narrowband communications). The operation(s) at block 1910 may be performed using the wireless communication manager 1020 described with reference to FIGS. 10, 11, and 14, or the UE device identifier 1040 described with reference to FIGS. 10 and 11.

At block 1915, the method 1900 may include allocating at least a first portion of the time resources and the frequency resources to a UL channel. In some examples, a same set of frequency resources may be allocated to the UL channel for a first slot and a second slot of each subframe in the plurality of subframes. In some examples, a same set of frequency resources or a different set of frequency resources may be allocated to the UL channel from one subframe to another subframe in the plurality of subframes. In some cases, the UL channel may be an example of a UL control channel such as a dedicated PUCCH. The operation(s) at block 1915 may be performed using the wireless communication manager 1020 described with reference to FIGS. 10, 11, and 14, or the UL channel resource allocator 1045 described with reference to FIGS. 10 and 11.

At block 1920, the method 1900 may include allocating a second portion of the time resources and the frequency resources to a PRACH. The operation(s) at block 1920 may be performed using the wireless communication manager 1020 described with reference to FIGS. 10, 11, and 14, the UE device resource allocator 1050 described with reference to FIG. 10, or the PRACH resource allocator 1105 described with reference to FIG. 11.

At block 1925, the method 1900 may include allocating a third portion of the time resources and the frequency resources to a PUSCH. The operation(s) at block 1925 may be performed using the wireless communication manager 1020 described with reference to FIGS. 10, 11, and 14, or the PUSCH resource allocator 1110 described with reference to FIG. 11.

At block 1930, the method 1900 may include allocating a fourth portion of the time resources and the frequency resources to a SRS. In some examples, resources for transmitting the SRS may be allocated in each symbol period of each of the plurality of subframes. In some examples, resources for transmitting the SRS may be allocated in a last symbol period of each subframe in which resources are allocated to the UL channel or the PUSCH. The operation(s) at block 1930 may be performed using the wireless communication manager 1020 described with reference to FIGS. 10, 11, and 14, or the SRS resource allocator 1115 described with reference to FIG. 11. The UL channel, the PRACH, the PUSCH, and the SRS may be multiplexed in the time domain (on the time resources identified for narrowband communication at block 1905), the frequency domain (on the frequency resources identified for narrowband communication at block 1905), or a combination thereof.

At block 1935, the method 1900 may optionally include allocating a same number of resources of the UL channel to reference symbol transmissions and data symbol transmissions. The operation(s) at block 1935 may be performed using the wireless communication manager 1020 described with reference to FIGS. 10, 11, and 14, or the reference symbol allocator 1120 described with reference to FIG. 11.

At block 1940, the method 1900 may include allocating resources of the UL channel to the identified plurality of UE devices. In some examples, resources of the UL channel may be allocated to the plurality of UE devices using intra-resource block frequency hopping. In some examples, resources of the UL channel may be additionally or alternatively allocated to a UE device of the plurality of UE devices based at least in part on a CE level associated with the UE device. In some examples, the resources of the UL channel allocated to the plurality of UE devices may include bundled TTIs. The operation(s) at block 1940 may be performed using the wireless communication manager 1020 described with reference to FIGS. 10, 11, and 14, or the UE device resource allocator 1050 described with reference to FIGS. 10 and 11.

Thus, the method 1900 may provide for wireless communication. It should be noted that the method 1900 is just one implementation and that the operations of the method 1900 may be rearranged or otherwise modified such that other implementations are possible.

In some examples, aspects of the methods 1600, 1700, 1800, or 1900 described with reference to FIGS. 16-19 may be combined.

Figure 20:
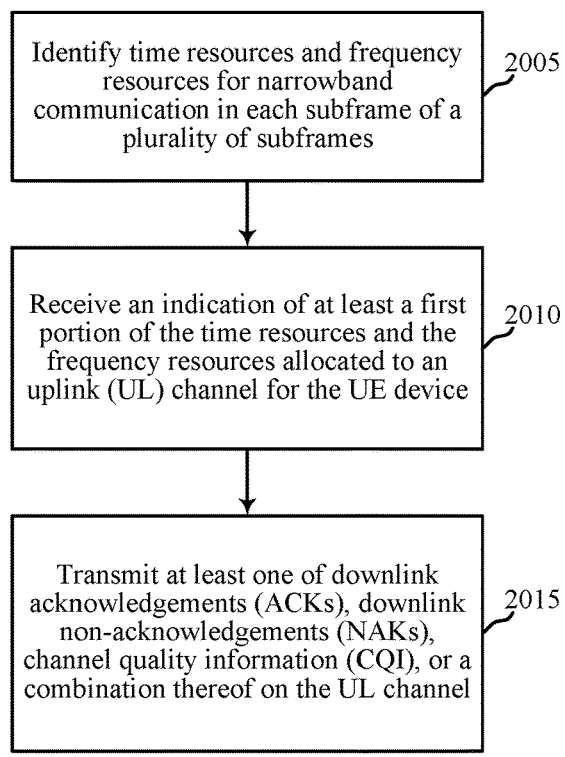
FIG. 20 is a flow chart illustrating an example of a method for wireless communication at a UE device, in accordance with various aspects of the present disclosure.

FIG. 20 is a flow chart illustrating an example of a method 2000 for wireless communication at a UE device, in accordance with various aspects of the present disclosure. For clarity, the method 2000 is described below with reference to aspects of one or more of the UE devices 115 described with reference to FIGS. 1, 2, and 15, aspects of the device 1215 described with reference to FIG. 12, or aspects of one or more of the wireless communication managers 1220 described with reference to FIGS. 12, 13, and 15. In some examples, a UE device may execute one or more sets of codes to control the functional elements of the UE device to perform the functions described below. Additionally or alternatively, the UE device may perform one or more of the functions described below using special-purpose hardware.

At block 2005, the method 2000 may include identifying time resources and frequency resources for narrowband communication in each subframe of a plurality of subframes. The identified resources may include out-of-band resources or in-band resources, as described with reference to FIG. 3. The operation(s) at block 2005 may be performed using the wireless communication manager 1220 described with reference to FIGS. 12, 13, and 15, or the resource identifier 1235 described with reference to FIGS. 12 and 13.

At block 2010, the method 2000 may include receiving an indication of at least a first portion of the time resources and the frequency resources allocated to a UL channel for the UE device. In some cases, the UL channel may be an example of a UL control channel such as a dedicated PUCCH. The operation(s) at block 2010 may be performed using the wireless communication manager 1220 described with reference to FIGS. 12, 13, and 15, or the UL channel resource identifier 1240 described with reference to FIGS. 12 and 13.

At block 2015, the method 2000 may include transmitting at least one of downlink ACKs, downlink NAKs, CQI, or a combination thereof on the UL channel. The operation(s) at block 2015 may be performed using the wireless communication manager 1220 described with reference to FIGS. 12, 13, and 15, or the feedback transmission manager 1245 described with reference to FIGS. 12 and 13.

Thus, the method 2000 may provide for wireless communication. It should be noted that the method 2000 is just one implementation and that the operations of the method 2000 may be rearranged or otherwise modified such that other implementations are possible.

Figure 21:
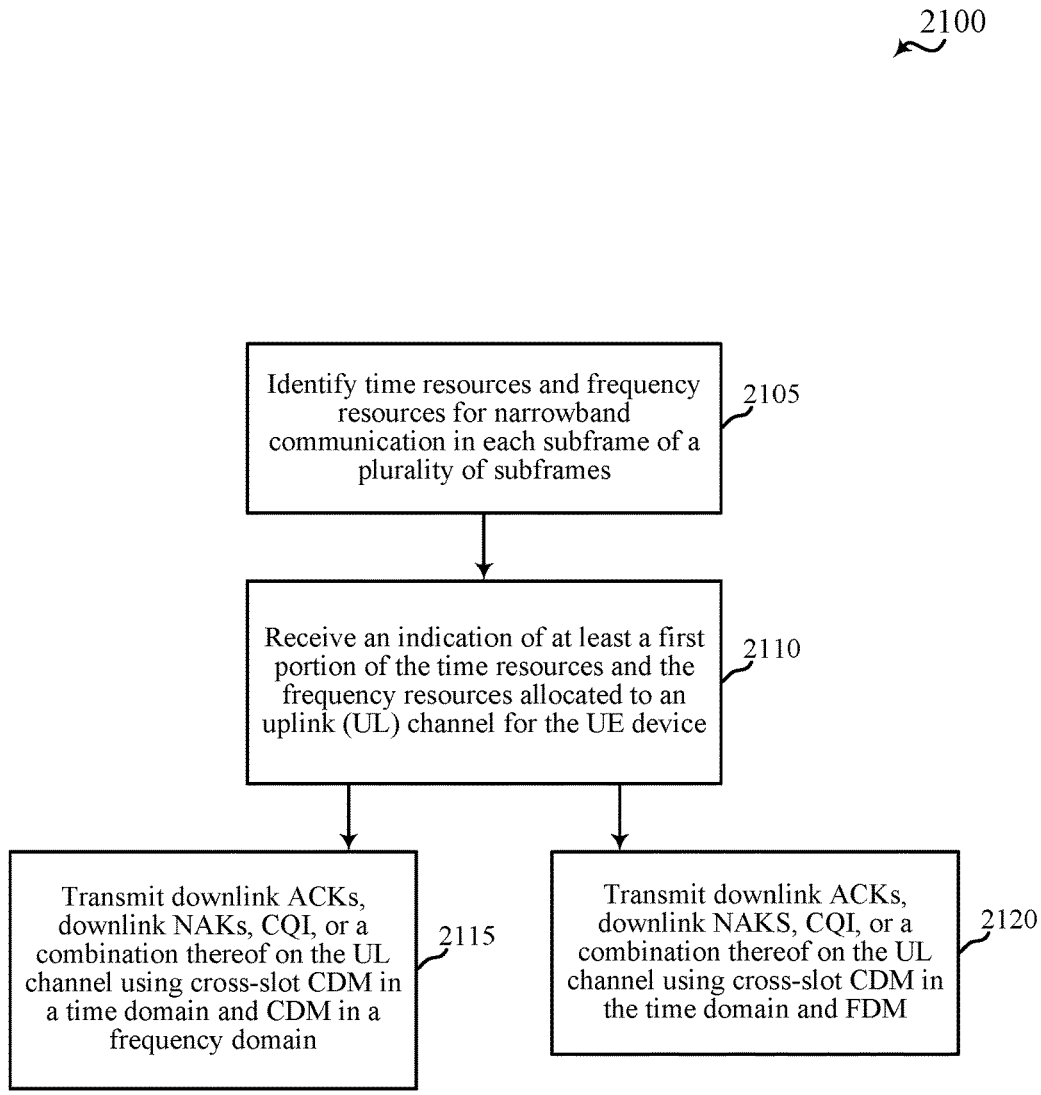
FIG. 21 is a flow chart illustrating an example of a method for wireless communication at a UE device, in accordance with various aspects of the present disclosure.

FIG. 21 is a flow chart illustrating an example of a method 2100 for wireless communication at a UE device, in accordance with various aspects of the present disclosure. For clarity, the method 2100 is described below with reference to aspects of one or more of the UE devices 115 described with reference to FIGS. 1, 2, and 15, aspects of the device 1215 described with reference to FIG. 12, or aspects of one or more of the wireless communication managers 1220 described with reference to FIGS. 12, 13, and 15. In some examples, a UE device may execute one or more sets of codes to control the functional elements of the UE device to perform the functions described below. Additionally or alternatively, the UE device may perform one or more of the functions described below using special-purpose hardware.

At block 2105, the method 2100 may include identifying time resources and frequency resources for narrowband communication in each subframe of a plurality of subframes. The identified resources may include out-of-band resources or in-band resources, as described with reference to FIG. 3. The operation(s) at block 2105 may be performed using the wireless communication manager 1220 described with reference to FIGS. 12, 13, and 15, or the resource identifier 1235 described with reference to FIGS. 12 and 13.

At block 2110, the method 2100 may include receiving an indication of at least a first portion of the time resources and the frequency resources allocated to a UL channel for the UE device. In some cases, the UL channel may be an example of a UL control channel such as a dedicated PUCCH. The operation(s) at block 2110 may be performed using the wireless communication manager 1220 described with reference to FIGS. 12, 13, and 15, or the UL channel resource identifier 1240 described with reference to FIGS. 12 and 13.

At block 2115, the method 2100 may include transmitting at least one of downlink ACKs, downlink NAKs, CQI, or a combination thereof on the UL channel. The operation(s) at block 2115 may be performed using the wireless communication manager 1220 described with reference to FIGS. 12, 13, and 15, or the feedback transmission manager 1245 described with reference to FIGS. 12 and 13.

Following the operation(s) at block 2110, the method 2100 may continue at block 2115 or block 2120. At block 2115 or 2120, the method 2100 may include transmitting at least one of downlink ACKs, downlink NAKs, CQI, or a combination thereof on the UL channel. At block 2115, the method 2100 may include transmitting the downlink ACKs, downlink NAKs, and/or CQI on the UL channel using cross-slot CDM in a time domain and CDM in a frequency domain. In some examples, the cross-slot CDM in the time domain may include cross-subframe CDM in the time domain. The operation(s) at block 2115 may be performed using the wireless communication manager 1220 described with reference to FIGS. 12, 13, and 15, the feedback transmission manager 1245 described with reference to FIGS. 12 and 13, or the CDM transmission manager 1305 described with reference to FIG. 13.

At block 2120, the method 2100 may include transmitting the downlink ACKs, downlink NAKs, and/or CQI on the UL channel using cross-slot CDM in the time domain and FDM. In some examples, the cross-slot CDM in the time domain may include cross-subframe CDM in the time domain. The operation(s) at block 2120 may be performed using the wireless communication manager 1220 described with reference to FIGS. 12, 13, and 15, the feedback transmission manager 1245 described with reference to FIGS. 12 and 13, or the CDM transmission manager 1305 or FDM transmission manager 1310 described with reference to FIG. 13.

In some examples, the method 2100 may include transmitting a same number of reference symbols and data symbols on the UL channel.

Thus, the method 2100 may provide for wireless communication. It should be noted that the method 2100 is just one implementation and that the operations of the method 2100 may be rearranged or otherwise modified such that other implementations are possible.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication at a base station, comprising:
    identifying time resources and frequency resources for narrowband communication in a plurality of subframes;
    identifying a plurality of user equipment (UE) devices;
    allocating at least a first portion of the time resources and the frequency resources to an uplink (UL) channel to carry UL control information, wherein the first portion includes a first slot of seven symbols and a second slot of seven symbols;
allocating resources of the UL channel to the identified plurality of UE devices, wherein the allocated resources include single tone allocations for the identified plurality of UE devices; and
allocating symbols one, two, six and seven of the first slot and the second slot for UL data transmissions and symbols three, four and five of the first slot and the second slot for reference symbol transmissions.

2. The method of claim 1, further comprising:
receiving from one or more of the plurality of UE devices, on the UL channel, one or both of downlink acknowledgements (ACKs) and downlink non-acknowledgements (NAKs).

3. The method of claim 1, further comprising:
multiplexing the UL channel with a physical uplink shared channel (PUSCH), a physical random access channel (PRACH), a sounding reference signal (SRS), or a combination thereof, in one or both of a time domain and a frequency domain.

4. The method of claim 1, wherein the UL channel comprises a dedicated physical uplink control channel (PUCCH).

5. The method of claim 1, further comprising:
allocating a same number of resources of the UL channel to reference symbol transmissions and data symbol transmissions.

6. The method of claim 1, wherein allocating resources of the UL channel to the plurality of UE devices comprises:
allocating resources of the UL channel to the plurality of UE devices using frequency domain multiplexing (FDM).

7. The method of claim 1, further comprising:
receiving on the UL channel, in parallel, a single tone transmission from the plurality of UE devices.

8. The method of claim 1, further comprising:
receiving from a UE device of the plurality of UE devices, in parallel on the UL channel, a plurality of single tone transmissions.

9. The method of claim 1, wherein allocating at least the first portion of the time resources and the frequency resources to the UL channel comprises:
allocating a same set of frequency resources to the UL channel for a first slot and a second slot in the plurality of subframes.

10. The method of claim 1, wherein allocating at least the first portion of the time resources and the frequency resources to the UL channel comprises:
allocating a same set of frequency resources to the UL channel from one subframe to another subframe in the plurality of subframes.

11. The method of claim 1, wherein allocating resources of the UL channel to the plurality of UE devices comprises:
allocating resources of the UL channel to the plurality of UE devices using intra-resource block frequency hopping.

12. The method of claim 1, wherein the time resources and the frequency resources of the UL channel allocated to the plurality of UE devices comprise bundled transmission time intervals (TTIs).

13. The method of claim 1, further comprising:
approximating channel state information (CSI) for at least one downlink of the narrowband communication based at least in part on a measurement of a sounding reference signal (SRS), channel quality information (CQI) for an uplink of the narrowband communication, a CQI received on a physical uplink shared channel (PUSCH), or a combination thereof.

14. The method of claim 1, wherein allocating resources of the UL channel to the plurality of UE devices comprises:
allocating resources of the UL channel to a UE device of the plurality of UE devices based at least in part on a coverage enhancement (CE) level associated with the UE device.

15. The method of claim 1, further comprising:
transmitting a sounding reference signal (SRS) during each symbol period of each subframe of the plurality of subframes.

16. An apparatus for wireless communication at a base station, comprising:
a processor;
memory in communication with the processor; and
instructions stored in the memory, the instructions being executable by the processor to cause the apparatus to:
identify time resources and frequency resources for narrowband communication in a plurality of subframes;
identify a plurality of user equipment (UE) devices;
allocate at least a first portion of the time resources and the frequency resources to an uplink (UL) channel to carry UL control information, wherein the first portion includes a first slot of seven symbols and a second slot of seven symbols;
allocate resources of the UL channel to the identified plurality of UE devices, wherein the allocated resources include single tone allocations for the identified plurality of UE devices; and
allocate symbols one, two, six and seven of the first slot and the second slot for UL data transmissions and symbols three, four and five of the first slot and the second slot for reference symbol transmissions.

17. The apparatus of claim 16, wherein the instructions are executable by the processor to:
receive from one or more of the plurality of UE devices, on the UL channel, one or both of downlink acknowledgements (ACKs) and downlink non-acknowledgements (NAKs).

18. The apparatus of claim 16, wherein the instructions are executable by the processor to:
multiplex the UL channel with a physical uplink shared channel (PUSCH), a physical random access channel (PRACH), a sounding reference signal (SRS), or a combination thereof, in one or both of a time domain and a frequency domain.

19. The apparatus of claim 16, wherein the UL channel comprises a dedicated physical uplink control channel (PUCCH).

20. The apparatus of claim 16, wherein the instructions are executable by the processor to:
allocate a same number of resources of the UL channel to reference symbol transmissions and data symbol transmissions.

21. The apparatus of claim 16, wherein the instructions executable by the processor to allocate resources of the UL channel to the plurality of UE devices comprise instructions executable by the processor to:
allocate resources of the UL channel to the plurality of UE devices using frequency domain multiplexing (FDM).

22. The apparatus of claim 16, wherein the instructions executable by the processor to allocate at least the first portion of the time resources and the frequency resources to the UL channel comprise instructions executable by the processor to:

allocate a same set of frequency resources to the UL channel for a first slot and a second slot in the plurality of subframes.

23. The apparatus of claim 16, wherein the instructions executable by the processor to allocate at least the first portion of the time resources and the frequency resources to the UL channel comprise instructions executable by the processor to:

allocate a same set of frequency resources to the UL channel from one subframe to another subframe in the plurality of subframes.

24. The apparatus of claim 16, wherein the instructions executable by the processor to allocate resources of the UL channel to the plurality of UE devices further comprise instructions executable by the processor to:

allocate resources of the UL channel to the plurality of UE devices using intra-resource block frequency hopping.

25. The apparatus of claim 16, wherein the time resources and the frequency resources of the UL channel allocated to the plurality of UE devices comprise bundled transmission time intervals (TTIs).

26. The apparatus of claim 16, wherein the instructions executable by the processor to allocate resources of the UL channel to the plurality of UE devices further comprise instructions executable by the processor to:

allocate resources of the UL channel to a UE device of the plurality of UE devices based at least in part on a coverage enhancement (CE) level associated with the UE device.

27. A method for wireless communication at a user equipment (UE) device, comprising:

identifying time resources and frequency resources for narrowband communication in a plurality of subframes;

receiving an indication that at least a first portion of the time resources and the frequency resources are allocated to an uplink (UL) channel to carry UL control information for the UE device, wherein the first portion includes a single tone allocation for the UE, wherein the first portion includes a first slot of seven symbols and a second slot of seven symbols and symbols one, two, six and seven of the first and second slots are allocated for UL data transmissions and symbols three, four and five of the first and second slots are allocated for reference symbol transmissions; and transmitting one or both of downlink acknowledgements (ACKs) and downlink non-acknowledgements (NAKs) in one or more of symbols one, two, six or seven of at least one of the first slot or the second slot of the first portion.

28. The method of claim 27, further comprising:
transmitting a physical uplink shared channel (PUSCH), wherein the UL channel is multiplexed with the PUSCH.

29. The method of claim 27, wherein the UL channel comprises a dedicated physical uplink control channel (PUCCH).

30. The method of claim 27, further comprising:
transmitting a same number of reference symbols and data symbols on the UL channel.

31. The method of claim 27, further comprising:
transmitting on the UL channel using frequency domain multiplexing (FDM).

32. An apparatus for wireless communication at a user equipment (UE) device, comprising:

a processor;

memory in communication with the processor; and instructions stored in the memory, the instructions being executable by the processor to:

identify time resources and frequency resources for narrowband communication in a plurality of subframes;

receive an indication that at least a first portion of the time resources and the frequency resources are allocated to an uplink (UL) channel to carry UL control information for the UE device, wherein the first portion includes a single tone allocation for the UE, wherein the first portion includes a first slot of seven symbols and a second slot of seven symbols and symbols one, two, six and seven of the first and second slots are allocated for UL data transmissions and symbols three, four and five of the first and second slots are allocated for reference symbol transmissions; and transmit one or both of downlink acknowledgements (ACKs) and downlink non-acknowledgements (NAKs) in one or more of symbols one, two, six or seven of at least one of the first slot or the second slot of the first portion.

33. The apparatus of claim 32, wherein the instructions are executable by the processor to:

transmit a physical uplink shared channel (PUSCH), wherein the UL channel is multiplexed with the PUSCH.

34. The apparatus of claim 32, wherein the UL channel comprises a dedicated physical uplink control channel (PUCCH).

35. The apparatus of claim 32, wherein the instructions are executable by the processor to:

transmit a same number of reference symbols and data symbols on the UL channel.

36. The apparatus of claim 32, wherein the instructions are executable by the processor to:

transmit on the UL channel using cross-slot frequency domain multiplexing (FDM).

* * * * *